(12) United States Patent
Rando

(10) Patent No.: US 12,079,743 B2
(45) Date of Patent: Sep. 3, 2024

(54) METHODS AND SYSTEMS FOR PROCESSING ELECTRONIC COMMUNICATIONS FOR A FOLDER

(71) Applicant: WorkStarr, Inc., Attleboro, MA (US)

(72) Inventor: Joseph D Rando, Sharon, MA (US)

(73) Assignee: WorkStarr, Inc, Attleboro, MA (US)

( * ) Notice: Subject to any disclaimer, the term of this patent is extended or adjusted under 35 U.S.C. 154(b) by 973 days.

(21) Appl. No.: 17/030,868

(22) Filed: Sep. 24, 2020

(65) Prior Publication Data

US 2021/0027222 A1 Jan. 28, 2021

Related U.S. Application Data

(63) Continuation-in-part of application No. 16/519,134, filed on Jul. 23, 2019, now Pat. No. 10,817,782.

(51) Int. Cl.
*G06Q 10/0631* (2023.01)
*G06F 16/16* (2019.01)
*G06N 20/00* (2019.01)

(52) U.S. Cl.
CPC ..... *G06Q 10/06311* (2013.01); *G06F 16/164* (2019.01); *G06F 16/168* (2019.01); *G06N 20/00* (2019.01)

(58) Field of Classification Search
CPC ............ G06Q 10/06311; G06F 16/164; G06F 16/168; G06F 40/279; G06F 40/205; G06N 20/00; G06N 7/01
See application file for complete search history.

(56) References Cited

U.S. PATENT DOCUMENTS

| | | | |
|---|---|---|---|
| 9,055,419 B2 * | 6/2015 | Li | G06F 16/38 |
| 9,690,461 B2 | 6/2017 | Holler et al. | |
| 10,042,636 B1 | 8/2018 | Srivastava et al. | |
| 10,235,646 B2 | 3/2019 | Perry et al. | |
| 10,241,654 B2 | 3/2019 | Meyer et al. | |
| 2001/0042087 A1 * | 11/2001 | Kephart | G06F 16/353 |
| | | | 707/E17.09 |
| 2003/0135565 A1 * | 7/2003 | Estrada | G06Q 10/10 |
| | | | 709/206 |
| 2005/0102394 A1 | 5/2005 | Loveland | |
| 2014/0006972 A1 * | 1/2014 | Celkonas | G06Q 10/101 |
| | | | 715/753 |
| 2015/0339619 A1 | 11/2015 | Dumont et al. | |

(Continued)

OTHER PUBLICATIONS

Burger, Rachel; I, project manager: the rise of artificial intelligence in the workplace; Capterra; Jun. 17, 2017; retrieved from: https://blog.capterra.com/i-project-manager-the-rise-of-artificial-intelligence-in-the-workplace/.

(Continued)

*Primary Examiner* — K C Chen
(74) *Attorney, Agent, or Firm* — Caldwell Intellectual Property Law

(57) ABSTRACT

A system for processing electronic communications, including a computing device. The computing device receives a first communication datum, locates a folder relating to the first communication datum, generates a communication learner, outputs a response as a function of generating the communication learner, identifies a second communication datum as a function of the response, and updates the folder to include the second communication datum.

18 Claims, 17 Drawing Sheets

(56) References Cited

U.S. PATENT DOCUMENTS

| | | |
|---|---|---|
| 2016/0224939 A1* | 8/2016 | Chen ................ G06Q 10/06311 |
| 2017/0193349 A1* | 7/2017 | Jothilingam ........... G06N 20/20 |
| 2017/0249574 A1 | 8/2017 | Knijnik et al. |
| 2017/0285897 A1 | 10/2017 | Liensberger et al. |
| 2018/0189706 A1 | 7/2018 | Newhouse et al. |
| 2018/0341903 A1 | 11/2018 | Keen et al. |
| 2019/0026663 A1 | 1/2019 | Homeyer et al. |
| 2019/0050771 A1 | 2/2019 | Meharwade et al. |
| 2019/0066021 A1 | 2/2019 | Tang et al. |
| 2019/0129938 A1* | 5/2019 | Yao ....................... H04L 12/282 |
| 2020/0097544 A1* | 3/2020 | Alexander ............. G06F 40/35 |
| 2021/0409363 A1* | 12/2021 | Neumann ............... H04L 51/02 |

OTHER PUBLICATIONS

Weilewski, Euan; Automating project management with deep learning: How natural language processing can be used to classify project status updates; Towards Science; Jan. 17, 2019; retrieved from: https://towardsdatascience.com/automating-project-management-with-deep-learning-bd5b851235eb.

Asana, The only tool you need for task management and lists; Apr. 24, 2019; retrieved from: https://asana.com/uses/task-management?utm_campaign=NB--US--EN--Tasks--Desktop&utm_source=google&utm_medium=pd_cpc_nb&utm_content=341322437951&gclid=EAlaIQobChMIoPXxr4_p4QIVLf7jBx0SBAm0EAMYASAAEgL0KPD_BwE.

* cited by examiner

Task Detail 604

Title 608

Assigned By 616

Start Date 624

Assigned To 612

Relates To 620

Discussion 628

Attachments 632

Meeting 636

Recurring 640

Private Notes 644

Due Date 648

Description 652

Save 656

Complete 660

Cancel 664

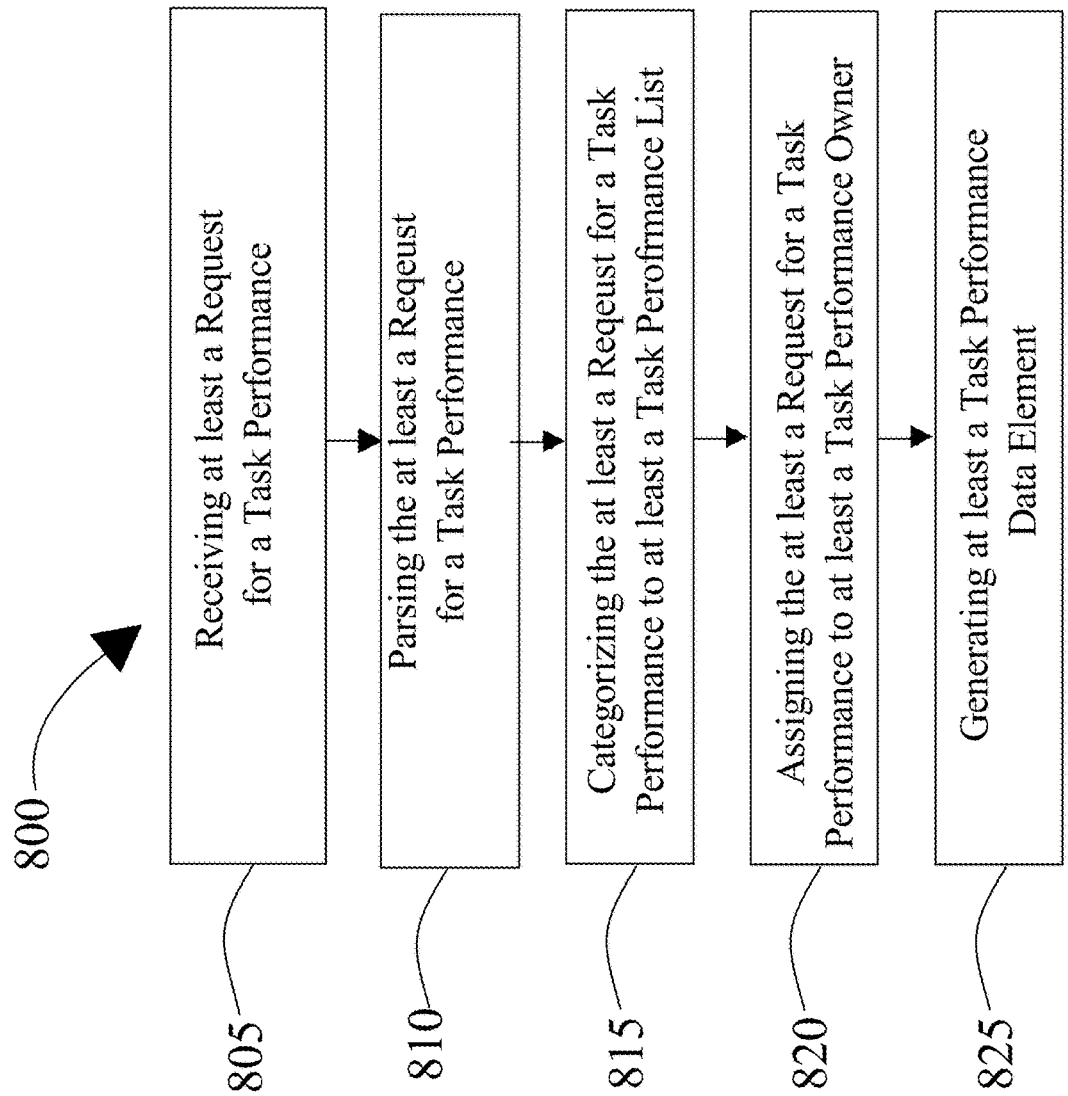

METHODS AND SYSTEMS FOR PROCESSING ELECTRONIC COMMUNICATIONS FOR A FOLDER

RELATED APPLICATION DATA

This application is a continuation-in-part of Ser. No. 16/519,134 filed on Jul. 23, 2019 and entitled "METHODS AND SYSTEMS FOR TEXTUAL ANALYSIS OF TASK PERFORMANCES," which is hereby incorporated by reference herein in its entirety.

FIELD OF THE INVENTION

The present invention generally relates to the field of artificial intelligence. In particular, the present invention is directed to methods and systems for textual analysis of task performances.

BACKGROUND

Automated textual analysis and correct usage of textual analysis can be challenging due to the quantity of text to be analyzed along with knowing what to do with text that has been analyzed. Incorrect use of text can lead to errors in transmission as well as cluttered information that takes up electronic space.

SUMMARY OF THE DISCLOSURE

In an aspect, a system for processing electronic communications the system comprising a computing device, the computing device configured to receive a first communication datum; locate a folder relating to the first communication datum; generate a communication learner, wherein the communication learner uses historical communication data as an input and outputs a response using a first machine-learning process; output a response as a function of generating the communication learner; identify a second communication datum as a function of the response; and update the folder to include the second communication datum.

In an aspect, a method of processing electronic communications the method comprising receiving by a computing device, a first communication datum; locating by the computing device, a folder relating to the first communication datum; generating by the computing device, a communication learner, wherein the communication learner uses historical communication data as an input and outputs a response using a first machine-learning process; outputting by the computing device, a response as a function of generating the communication learner; identifying by the computing device a second communication datum as a function of the response; and updating by the computing device, the folder to include the second communication datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6 is a block diagram illustrating an exemplary embodiment of a graphical user interface for a task detail;

FIGS. 7A-F are screenshots illustrating exemplary embodiments of a graphical user interface for digitally building task performances;

FIG. 8 is a flow diagram illustrating an exemplary embodiment of a method of textual analysis of task performances;

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for processing electronic communications. In an embodiment, an electronic communication including a first communication datum such as an email or text message is utilized by a computing device to locate a folder relating to the electronic communication. A computing device generates a communication learner to output a response personalized to a user. The response is utilized to identify a second communication datum and update the folder to include the second communication datum.

Figure 1:
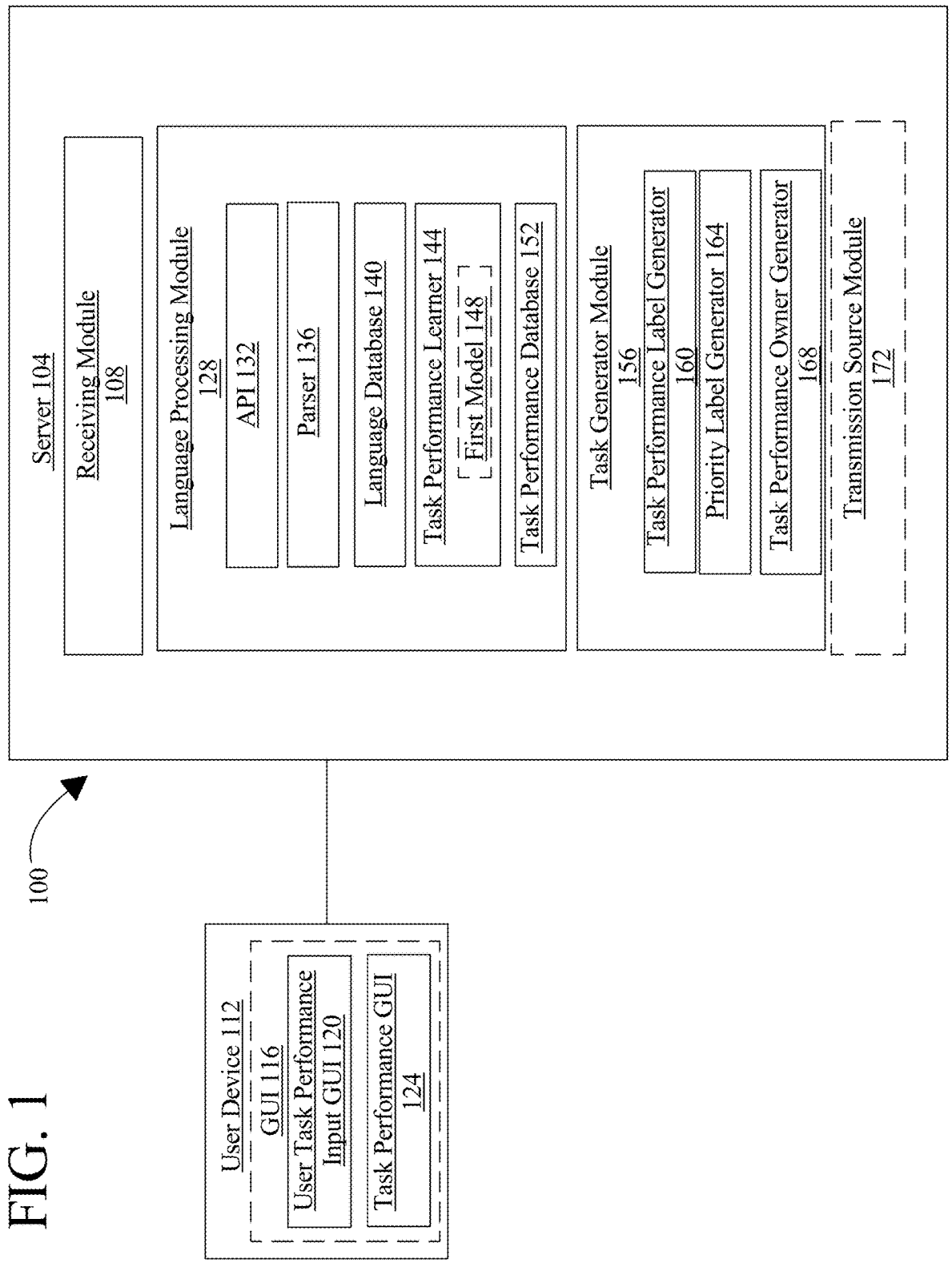
FIG. 1 is a flow diagram illustrating an exemplary embodiment of a system for textual analysis of task performances.

Referring now to the drawings, FIG. 1 illustrates an exemplary system 100 for textual analysis of task performances. System 100 includes at least a computing device 104. At least a computing device 104 may include any computing device as described herein, including without limitation a microcontroller, microprocessor, digital signal processor (DSP) and/or system on a chip (SoC). At least a computing device 104 may include, be included in, and/or communicate with a mobile device such as a mobile telephone or smartphone. At least a computing device 104 may include a single computing device operating independently, or may include two or more computing device operating in concert, in parallel, sequentially or the like; two or more computing devices may be included together in a single computing device or in two or more computing devices. At least a computing device 104 may communicate with other devices such as a user device as described in more detail below through a network interface. Network interface device may be utilized for connecting at least a computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. At least a computing device 104 may include but is not limited to, for example, a at least a computing device 104 or cluster of computing devices in a first location and a second computing device or cluster of computing devices in a second location. At least a computing device 104 may include one or more computing devices dedicated to data storage, security, distribution of traffic for load balancing, and the like. At least a computing device 104 may distribute one or more computing tasks as described below across a plurality of computing devices of computing device, which may operate in parallel, in series, redundantly, or in any other manner used for distribution of tasks or memory between computing devices. At least a computing device 104 may be implemented using a "shared nothing" architecture in which data is cached at the worker, in an embodiment, this may enable scalability of system 100 and/or computing device.

With continued reference to FIG. 1, system 100 includes a receiving module 108 operating on the at least a server. Receiving module 108 may include any suitable hardware or software module. In an embodiment, receiving module 108 is designed and configured to receive at least a request for a task performance. At least a request for a task performance as used herein includes a description of any task that needs to be completed. A task may include a personal task, work related task, community involvement task, and the like. For example, a task may include a work-related task such as creating a rideable rocket toy for toddlers or surveying a rideable rocket toy market. In yet another non-limiting example, a task may include a personal task such as obtaining a painter or setting up a weekly grocery allocation. A task may include a community involvement task such as preparing foodstuffs for a local food pantry or organizing a charity softball tournament. A task may relate to a hobby or leisure time activity such as an appointment with a personal trainer or participating in a spartan race. A task may include a project and/or an action. A project as used herein includes a task that includes at least a sub-task. A sub-task, as used herein includes an element of a task that may be completed as part of a task. A sub-task may include a task broken down into smaller steps. In an embodiment, sub-tasks may be broken down indefinitely into further sub-tasks. For example, a project such as creating a rideable rocket toy for toddlers may be broken down into sub-tasks that may include several steps necessary to complete the project. This may include for example, developing three rideable rocket toys, choosing a rideable rocket toy, building a prototype rideable rocket toy, performing a rideable rocket toy market analysis, finalizing a rideable rocket toy rollout plan, and producing and a rideable rocket toy. In yet another non-limiting example, a task may be created by John G. that is described as finding a new maintenance worker for an air-conditioner. In such an instance, John G. may break down the task into sub-tasks that include make a list of 3 companies, call companies to request a proposal, review proposals, and choose company. Sub-tasks may be assigned to other people as described below. For example, John G. may assign a sub-task such as to call workers to request proposal to his assistant, who may break that sub-task down further into three different sub-tasks, one for each individual that John G.'s assistant calls. An action as used herein includes a task that does not contain any sub-task. An action may include for example, a task such as buying new shoes, or ordering wood. In an embodiment, an action may be completed in one step and may not contain any smaller steps that need to be completed in order to complete the action. In an embodiment, an action may be transformed into a project when a sub-task has been added and/or assigned.

With continued reference to FIG. 1, at least a request for a task performance may be received from a user device 112. User device 112 may include an additional computing device, such as a mobile device, laptop, desktop computer, or the like. In an embodiment, user device 112 may be a computer and/or workstation operated by a user. User may include an individual who creates at least a request for a task performance and/or an individual who has been assigned at least a request for a task performance. At least a request for a task performance may be received from a conversational response. Conversational response as used herein may include any communication from at least a user. Conversational response may include for example, an email, message, textual documentation of a conversation, document, notes, explanation, description, and the like that contains a communication from at least a user. Conversational response may include a communication between two or more users, such as for example an email between two users or an email sent to a group of users such as an email thread between a knitting club group or a document containing input from three users in a shared location.

With continued reference to FIG. 1 user device 112 may include a graphical user interface (GUI 116), which may display information pertaining to at least a request for a task performance. GUI 116 may include without limitation a form or other graphical element having data entry fields, where a user may enter information describing one or more requests for a task performance as described in more detail below. GUI 116 may allow for interaction between a user and system 100 to display task performances which may be categorized in specific categories as described below in more detail.

With continued reference to FIG. 1, GUI 116 may include user task performance input GUI 120 which may allow for and display user task performance inputs to allow a user to input information pertaining at least a request for a task performance. User task performance input GUI 120 may contain data entry fields that a user may enter specific information into such as for example by textual inputs and/or voice to text commands. For example, data entry fields may include without limitation a field containing a title whereby a user can enter a title describing at least a request for a task performance. For example, a title may include "Create rideable rocket toy for toddlers (RRS)." Data entry fields may include without limitation a field containing an assigned to option whereby a user can assign at least a request for a task performance to an individual. For example, a user may assign at least a request for a task performance to user and/or to another individual such as a coworker, family member or friend. In an embodiment, field containing an assigned to option may include a field where a user can enter an email address for the individual user is assigning at least a request for a task performance to. In an embodiment, as user types in a contact to assign to, a field may pop up and generate a list of previous contacts that a user has entered to make selection easier if a contact's information has been previously entered and/or assigned to. In such an instance, a user may select a contact from a pop-up field by highlighting a contact and selecting the contact. In an embodiment, assignments of tasks may be modified whereby a new assignee may be chosen such as when a task creator or assignor wishes to assign a task and/or sub-task to a new assignee. In an embodiment, a new task may initially be assigned to the task creator as a default. The task creator may then assign the task to another person or assignee by typing the other person's name or email address in the assigned to field. In an embodiment, an assignee may receive an email containing a task assignment notice detailing the task that has been assigned, while the task will appear on the assignor's waiting for list and have a status of "pending approval." In an embodiment, assigned to field may contain a drop-down menu selection containing connections and contacts who user may select to assign a task to. In an embodiment, assigned to field may contain a customizable field whereby a user can begin to type information into the assigned to field and system 100 will match text that user enters with names, usernames, and/or email addresses of user's connections and contacts. User may then select a choice from the drop-down menu such as by highlighting a selection. In an embodiment, a user may assign a task silently, whereby the assignee may not be notified of the task. A user may assign a task silently such as when the user does not know the assignee's email address, a user wants to delay assigning a task until a later date or time, or the user may feel uncomfortable about assigning a task to a superior or thinks that it will reflect poorly on user or in bad form. In an embodiment, a silent assignment may be performed such as by checking a box that states, "do not notify assignee." In such an instance, when an assignor unselects "do not notify assignee" then the assignee may be notified such as by email as described above.

With continued reference to FIG. 1, data entry fields may include without limitation a field containing an assigned by option whereby a user can enter information pertaining to who is assigning the at least a request for a task performance. For example, at least a request for a task performance may be assigned by user and/or by another. Data entry fields may include without limitation a field containing a relates to option whereby a user can enter information describing the field or category that at least a request for a task performance relates to. Category may include a class of items having particular shared characteristics. For example, at least a request for a task performance that is titled "create rideable rocket toy for toddlers (RRS)" may relate to a category such as new products. In yet another non-limiting example, at least a request for a task performance that is titled "place a job ad on a job board" may relate to a category such as recruiting. Data entry fields may include without limitation a field containing a start date which may include information as to when at least a request for a task performance may be initiated. For example, a start date may be listed as today if it will be started right away or may contain a future date such as next week, next month, or some specific date in the future.

Data entry fields may include without limitation a field containing due date which may include information as to when at least a request for a task performance must be completed by. For example, a due date may list a specific date by which at least a request for a task performance must be completed by, such as October $15^{th}$. In yet another non-limiting example, a due date may list a date in terms of weeks, months, and/or years by which at least a request for a task performance must be completed by, such as in 7 days, in 14 days, in 2 weeks, and the like. Data entry field may include without limitation a field containing a description, which may include information describing details and features of at least a request for a task performance. For example, at least a request for a task performance such as to "define rideable rocket toy requirements" may include a description such as "define the requirements for the rideable rocket toy to maximize market share in the toddler market." In an embodiment, data entry fields may be completed by a voice memo that may capture a user's inputs for certain data fields. For example, a user who is driving a motor vehicle may complete data entry fields through a voice to text option contained within GUI 116.

With continued reference to FIG. 1, data entry fields may include without limitation, at least a field containing information unique to each individual user of system 100. This may allow for actions and/or projects specific to each user to be displayed on user's own action list and/or task performance list as described in more detail below. For example, data entry field may include without limitation a field that prompts each user to enter user's first name and last name. Data entry field may include without limitation a field that allows for a user to create a unique username. Data entry field may include without limitation a field that allows for a user to create a password that may be associated with user's unique username. In an embodiment user may be prompted to enter password a second time. Data entry field may include without limitation demographic information pertaining to a user such as user email address, user mobile phone number, user other phone numbers such as home, office and the like, user address, and/or user company name. Data entry field may include without limitation a field that allows a user to optionally upload a photo of themselves. Data entry field may include without limitation a field that allows a user to enter skills that they possess such as for example punctuality, organized, diligence, leadership, basic computer skills, oral speaking skills, and the like.

With continued reference to FIG. 1, GUI 116 may contain task performance GUI 124. Task performance GUI 124 may display task performances that a user needs to complete. In an embodiment, task performances may be grouped into categories, organizing task performances as a function of if a task performance contains sub-tasks or not and/or if a task performance will be performed by user or another person. In an embodiment, task performances may be organized onto lists such as those generated by language processing module as described in more detail below. This may include for example, an action list, a project list, and/or a waiting for list as described in more detail below and in reference to FIG. 2.

With continued reference to FIG. 1, at least a request for a task performance may include at least a task performance file. Task performance file as used herein, includes any and all information pertaining to at least a request for a task performance. Information pertaining to at least a request for a task performance may include for example, discussion threads between users pertaining to the at least a request for a task performance. Information may include messages sent between users or messages that user may transmit to himself or herself pertaining to the at least a request for a task performance. Information may include files pertaining to the at least a request for a task performance. For example, at least a request for a task performance such as painting user's fence may include a file containing price estimates from three different painters. Information may include notes pertaining to the at least a request for a task performance. Notes may include for example user's thoughts and reflections after interviewing three different painters to paint user's house. Information may include appointments pertaining to the at least a request for a task performance. For example, at least a request for a task performance such as finding a landscaper to mow user's lawn may include appointments user has scheduled with different landscaping companies. In yet another non-limiting example, appointments may include appointments user has had or will have with other users who may participate with the at least a request for a task performance. For example, at least a request for a task performance such as recruiting a new hire at a company may include appointments a user has already had with potential job applicants as well as future appointments user may have with other potential job applicants. In such an instance, appointments with other co-workers in addition to user may be contained within appointments section, such as when a potential job applicant may meet with three different individuals within the company.

With continued reference to FIG. 1, system 100 includes a language processing module 128 operating on the at least a server. Language processing module 128 may include any suitable hardware or software module. Language processing module 128 may be designed and configured to parse the at least a request for a task performance and retrieve at least a task performance datum, categorize the at least a request for a task performance to at least a task performance list, and assign the at least a request for a task performance to at least a task performance owner. Language processing module 128 may be configured to extract from at least a request for a task performance one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols. Textual data may be parsed into segments, which may include a simple word (sequence of letters separated by whitespace) or more generally a sequence of characters as described previously. The term segments as used herein refers to any smaller, individual groupings of text from a larger source of text; segments may be broken up by word, pair of words, sentence, or other delimitation. These segments may in turn be parsed in various ways. Textual data may be parsed into words or sequences of words, which may be considered words as well. Textual data may be parsed into "n-grams", where all sequences of n consecutive characters are considered. Any or all possible sequences of segments or words may be stored as "chains", for example for use as a Markov chain or Hidden Markov Model.

With continued reference to FIG. 1, language processing module 128 may parse at least a request for a task performance to retrieve a task performance datum. Task performance datum as used herein, may include one more keywords pertaining to at least a request for a task performance. Keywords may include relevant information relating to the at least a request for a task performance and may include for example information pertaining to a category of at least a request for a task performance and/or at least a task performance owner. Category may include for example information pertaining to a task performance list, such as whether at least a request for a task performance may be placed on action list, project list, and/or waiting for list. Category may include for example information pertaining to one or more of the data entry fields as described above such as relates to data field, description field, and the like. Keywords may be extracted by language processing module 128 by creating associations between one or more words extracted from at least a request for a task performance including without limitation mathematical associations, between such words, and/or associations of extracted words with categories of task performances. For example, associations between at least a request for a task performance that includes an entry such as "schedule follow-up with Larry" may be associated with a category of task performance such as work because Larry is a colleague from work. Associations between extracted keywords may include mathematical associations, including without limitation statistical correlations between keywords, at least a request for a task performance, and/or categories of task performances. Statistical correlations and/or mathematical associations may include probabilistic formulas or relationships indicating, for instance, a likelihood that a given extracted word indicates a given category of task performance, and/or a given task performance owner. As a further example, statistical correlations and/or mathematical associations may include probabilistic formulas or relationships indicating a positive and/or negative association between a keyword and/or a category of at least a task performance and/or at least a task performance owner; positive or negative indication may include an indication that a given document is or is not indicating a category of task performance, and/or that a certain individual is or is not a task performance owner. For instance, and without limitation, a negative indication may be determined from a phrase such as "John is not allowed to set up interviews with new job candidates," whereas a positive indication may be determined from a phrase such as "Sally is allowed to set up interviews with new job candidates," as an illustrative example; whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in a memory located on the at least a server.

With continued reference to FIG. 1, language processing module 128 may contain application programming interface 132 (API). API 132 may contain communication protocols that may specify communications between for example, between language processing module 128 and other modules contained within computing device 104 and/or communications with GUI 116. Persons skilled in the art will appreciate that the components of API 132 may be not be physically resident within computing device 104 but may also be accessed through local or wide networks.

With continued reference to FIG. 1, language processing module 128 may contain parser 136. Parser 136 may parse at least a request for a task performance to retrieve a task performance datum as described in more detail above. Parser 136 may parse content of at least a request for a task performance received from a user device 112. Parser 136 may parse content of a conversational response to determine relevant portions to retrieve a task performance datum. Conversational response may include any communication from at least a user. Conversational response may include for example, an email, message, textual documentation of a conversation, document, notes, explanation, description, and the like that contains a communication from at least a user. In an embodiment, conversational response may include a communication from a plurality of users such as for example an email thread involving six different participants. In such an instance, parser 136 may parse the email thread containing messages from the six different participants to retrieve a task performance datum. In an embodiment, parser 126 may parse at least a request for a task performance containing an input from user device 112 and a conversational response.

Still referring to FIG. 1, language processing module 128 may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word keyword, a given relationship of such keywords to categories of task performances, and/or a task performance owner, There may be a finite number of keywords, a given relationship of such keywords to categories of task performances, and/or a given task owner to which an extracted word may pertain; an HMM inference algorithm, such as the forward-backward algorithm or the Viterbi algorithm, may be used to estimate the most likely discrete state given a word or sequence of words. Language processing module 128 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module 128 may contain language database 140. In an embodiment, parser 136 may access language database 140 to determine the meaning of at least a request for a task performance. Language database 140 may contain a glossary table that may contain information such as contextual meaning of at least a request for a task performance. Language database 140 may contain a voice recognition table that may identify spoken commands such as when a user interfaces with GUI 116 through a voice to text option. Language database 140 may contain a natural language table that may contain information pertaining to meaning of common language terms used in general conversations.

With continued reference to FIG. 1, language processing module 128 may categorize the at least a request for a task performance to at least a task performance list and assign the at least a task performance to at least a task performance owner. At least a request for a task performance may be categorized as a function of at least a task performance datum. In an embodiment, task may be categorized utilizing task performance learner as described in more detail below. In such an instance, task performance learner may categorize task performances utilizing machine-learning and generating machine-learning models, including any of the machine-learning models as described herein. Task performance list may include groupings of requests for a task performance based on common shared characteristics. Task performance list may include an action list. Action list may include a grouping of task performances that includes only action items. Action items may include actions that do not contain sub-tasks. Action items may include for example, a one-time action that does not contain sub-tasks such as ordering a pair of shoes, buying airline tickets to France, placing a request for dinner, and the like. In an embodiment, an action may be transformed into a project when a sub-task is added to an action, whether by a user and/or assigned by someone else. For example, an action such as buying a pair of shoes may be transformed into a project when a sub-task such as researching best evening dress shoes is added to the action. In yet another non-limiting example, an action such as schedule a date for Frank's retirement party may be transformed into a project when a user is assigned a sub-task such as call Mary and call Joe to see when they are available for Frank's retirement party.

With continued reference to FIG. 1, action items may contain data entry fields that allow a user who has created an action to enter details pertaining to an action. In an embodiment, action list may include an effort to complete data field that may contain information describing by a user the amount of time they estimate it will take to complete an action. In an embedment, an action detail data field may include a "mark complete" option that a user may mark to signal an action item as complete.

With continued reference to FIG. 1, task performance list may include a project list. Project list may include a grouping of task performances that includes only projects. Projects may include actions that do contain sub-tasks. In an embodiment, a project may be transformed into an action such as when a project contains only one sub-task that is either eliminated and/or completed. Project items may include a list of all current projects pertaining to a user such as a project for buying a new car, a project for organizing a dinner party, and a project for interviewing a new assistant manager at work. Projects may contain sub-tasks that may be constantly updated and/or broken down into further sub-tasks. In an embodiment, a sub-task may be broken down into a subsequent sub-task that may be further broken down into a subsequent sub-task. For example, a sub-task such as mowing the lawn may be broken down into a subsequent sub-task such as trim the hedges which may be broken down into a subsequent sub-task such as purchase new hedging equipment which may be further broken down into a sub-task such as take a trip to Home Depot. In yet another embodiment, a sub-task such as clean out the refrigerator may be broken down into a subsequent sub-task such as buy cleaning supplies which may be broken down into a subsequent sub-task such as buy bleach and ammonia. In an embodiment, a sub-task may be broken down indefinitely. Task performance list may include a waiting for list. Waiting for list may include a list of tasks assigned by a user to other people. For example, a sub-task such as purchase napkins that user has assigned to user's spouse, may be included on waiting for list. In yet another non-limiting example, an action titled "Purchase new computer" that a user has assigned to user's paralegal may be included on waiting list.

With continued reference to FIG. 1, task performance list may be customized to a user. For example, a task performance list containing action list may be customized to action items that user needs to perform. In such an instance, project list may contain projects that user needs to perform and waiting for list may include tasks assigned by the user to other people. For example, an action such as make a phone call that the user has assigned to another person would appear on the user's task performance list under the waiting for list. In such an instance, the person who has been assigned the action to make the phone call would see the phone call on that person's action list. Action list customized to user may contain actions assigned by user and/or another person. Action list customized to user contains only actions assigned to user. For example, an action that user's spouse will perform will not be contained on user's own individual action list. Action list customized to user contains only actions that do not contain any sub-tasks. Projects list customized to user may contain projects assigned by user and/or another person. Project list customized to user contains only projects assigned to user. For example, a project that user's secretary person will not be contained on user's own individual project list while a project that user will perform will be contained on user's individual project list. In an embodiment, user's project list may contain a mix of projects that may pertain to different areas of user's life. For example, user's project list may contain a personal project such as remodeling user's kitchen, a work-related project such as hire a new secretary, and a leisure time activity such as find new team member for user's recreational rugby team. User's project list will contain sub-tasks relating to each project. Waiting for list customized to user contains tasks assigned by user. Waiting for list customized to user contains tasks assigned to another person. Waiting for list customized to user may contain actions and/or projects and may or may not contain sub-tasks.

With continued reference to FIG. 1, task performance list including action list, project list, and/or waiting for list may contain data entry fields containing information specific and/or unique to each task. In an embodiment, certain data entry fields may be required, whereby a user must enter information in a specific data entry field. Data entry fields may include without limitation a task identifier that uniquely identifies each task. Data entry fields may include without limitation a task name. Task name may be searchable by a user who may be looking for a specific task.

With continued reference to FIG. 1, data entry field may include without limitation a created by field that may contain information as to who initially created the task. Data entry field may include without limitation a task creation date, which may include information as to what date the task was initially created. Data entry field may include without limitation an assigned by field, which may include information as to what user assigned the task, who may be known as the assignor. Data entry field may include without limitation assigned to field, which may include information as to whom the task is assigned to, and this person may also be known as the assignee. In an embodiment, a task may by default be assigned to the task creator or user, who must then choose to assign the task to another. Data entry field may include without limitation a task assigned date field, which may include information as to the date the task was assigned to another person by the task creator and/or assignor. In an embodiment, task assigned date field may be the same as the task creation date such as for example when a task is created and then assigned on the same day. In an embodiment, task assigned date field may be different than the task creation date such as for example when a task is created on a different day than the day the task is assigned. Data entry field may include without limitation start date, which may include information as to when work should commence on the task. In an embodiment, the task may be shown to be on hold before the start date. For example, a task having a start date two weeks in the future will be shown to be on hold for the two weeks until the actual start date occurs. In an embodiment, a user may modify a start date, even if a task has already been assigned. Data entry field may include without limitation due date field, which may include information as to the date when the task must be completed by. In an embodiment, user and/or task assignor may change a due date even if the task has been assigned. In an embodiment, another person and/or assignee who may wish to change due date set by an assignor may request a due date change to the assignor in order to get the date changed. Data entry field may include without limitation date completed field, which may include information as to the date that the assignee marks a task as completed. Data entry field may include without limitation date approved field, which may include information as to the date that the assignor may give approval to the task. In an embodiment, when a task has not been assigned such that the assignee and assignor are the same user, then the date completed, and the date approved will contain the same information. Data entry field may include without limitation relates to field, which may include information describing a physical object or other item that the task relates to. In an embodiment, relates to field may include a description of an item that a task may relate to such as a house, code module, vehicle, building and the like. In an embodiment, relates to field may include a description of a non-physical item that a task may relate to such as a personal goal, objective, mission, and the like. Data entry field may include without limitation sub-tasks field, which may include information describing a sub-task as a part of a project. In an embodiment, a sub-task may be optional. Data entry field may include without limitation description field, which may include information containing information that a task creator may enter to describe a task. In an embodiment, description field may be a required field and may be modified by creator and/or assignor of a task. Data entry field may include without limitation messages field, which may include message and/or emails compiled that relate to the task. Data entry field may include without limitation files field, which may include files relating to the task. For example, a task such as obtaining 3 price estimates for a kitchen remodel may contain a file containing the 3 separate price estimates. In yet another non-limiting example, a task such as interview candidates for San Francisco position may include several files with each file containing application materials for each specific candidate. Data entry field may include without limitation shared with field, which may include information pertaining to who a task has been shared with. Data entry field may include without limitation location field, which may include information describing where the task may be performed. For example, location field may include data entries such as work, home, driving, phone, and the like. In an embodiment, location may be selected by a user from a drop-down menu selection that a user may highlight the appropriate location. Location drop-down menu selection may be unique to each user and locations may be added and subtracted from the drop-down menu by a user. In an embodiment, a task that has been assigned to another user may not contain a data entry in the location field, so that the user who will perform the task will select from user's own location list where the task will be performed.

With continued reference to FIG. 1, data entry field may include without limitation effort to complete field, which may include information describing how long the task will take to be completed. In an embodiment, a task that contains sub-tasks such as a project, will have values for the time to complete sub-tasks added up from each individual sub-task and added into the total time to complete the project. In an embodiment, a task containing sub-tasks such as a project may calculate effort to complete by adding and totaling effort to complete for all sub-tasks. Effort to complete field may also contain without limitation an effort units field, which may contain information reflecting the units such as minutes or hours necessary to complete a task. In an embodiment, sub-tasks that may be part of a project may not contain a value but will be added into the total effort units to complete the project that the sub-tasks are a part of. For example, a project containing 3 separate sub-tasks that will each take 1 hour to complete will have an effort to complete of 3 hours with the effort units reflected as hours. In yet another non-limiting example, a project containing two sub-tasks that will each take 10 minutes to complete will have an effort to complete of 20 minutes with the effort units reflected as minutes. Data entry field may include without limitation appointments field, which may include information describing tasks that take place at a specific time and may have more than one assignee as described in more detail below. Data entry field may include without limitation recurrence field, which may include tasks that are performed on a recurring basis. For example, a task such as driving children to piano lessons may occur on a recurring basis such as every Thursday afternoon, and as such recurrence field may contain information reflecting this. Data entry field may include without limitation private notes field, which may include information relating to a task that are created by either a task creator and/or assignee and which may only be viewed by the task creator and/or assignee. In an embodiment, a user such as a task creator and/or assignee who creates a private note may share information contained within the private only if the task creator and/or assignee who created the private note grants such permission. Data entry field may include without limitation priority field, which may include information pertaining to the importance of a task. In an embodiment, priority field may include an entry such as normal priority such as when the task is not associated with additional importance. In an embodiment, priority field may include an entry such as high priority such as when a task is associated with additional importance. In an embodiment, assignor and assignee may have a different value for the priority field. Data entry field may include without limitation hold/release field, which may contain information as to whether or not a task has commenced. For example, hold/release field may contain an entry such as "on hold" if a task has not started yet. In an embodiment, an assignor may release a task before it leaves an "on hold" status.

With continued reference to FIG. 1, data entry field may include without limitation status field, which may include information reflecting whether an assignee has accepted and/or rejected a task from an assignor. In an embodiment, a task that has been accepted by an assignee may contain an entry in status field of "accepted" while a task that has been rejected by an assignee may contain an entry in status field of "rejected." Status field may also contain information describing status of tasks and sub-tasks. For example, when all sub-tasks for a project are completed the status of the project may contain an entry such as "sub-tasks complete." In an embodiment, an assignee may make a task as complete when assignee completes a task. For example, a user may assign a task such as obtain a price quote on new furniture to user's assistant, who may update the status of the task to complete after user's assistant has obtained price quote. In an embodiment, a user such as an assignor who has created a task can enter text into an approved field to reflect that a task has been completed and that assignor has granted approval on the task. Status field may be updated to reflect status throughout start date and due date. For example, a task may be labeled as "on track" such as when the task has not been given approval by task owner and it is not due or late. In yet another non-limiting example, a task may be labeled as "due" such as when the due date has closed, such as on the day of the established due date. In yet another non-limiting example, a task may be labeled as "late" when the due date has passed for a task.

With continued reference to FIG. 1, language processing module 128 may assign at least a request to at least a task performance owner. In an embodiment, at least a request for a task performance may be initially assigned to the user that created the at least a request for at ask performance. For example, a user who creates at least a request for a task performance such as rake the leaves may be initially assigned to user as task performance owner. User may then assign the at least a request for a task performance to another individual, known as assignee. Assignee may be a friend, family member, co-worker, colleague, other user of system 100, and the like. In an embodiment, assignee may not be a user of system 100 and may be contacted through an email notification. For example, a user who wishes to assign at least a request for a task performance to user's sister who does not participate in system 100 may email user's sister the at least a request for a task performance. In such an instance, an email notification sent to a user who does not participate in system 100 may contain a brief description of the at least a request for a task performance along with information about the at least a request for a task performance. In such an instance, there may be a link that a user may click on to enable a screen that may bring a non-user of system 100 to a screen for non-users. In an embodiment, an email sent to a nonuser of system 100 may contain a messaging link which may enable a nonuser to communicate with assignor of at least a request for a task performance. For example, a nonuser may wish to communicate with assignor to collect more details and questions concerning at least a request for a task performance. In an embodiment, an assignee who accepts at least a request for a task performance may form a connection with assignor who assigned the at least a request for a task performance which may be documented within a data field contained within the at least a request for a task performance. For example, a user who assigns at least a request for a task description such as obtain price quote on new shutters to user's secretary, may appear within the at least a request for a task description to obtain price quote on new shutters once user's secretary has accepted. In such an instance, the connection between user and user's secretary may be documented within notes section of the at least a request for a task description as described above in more detail. In such an instance, the at least a request for a task description containing a task to obtain a price quote on new shutters may appear on user's waiting for list and may appear on user's secretary's action list.

With continued reference to FIG. 1, language processing module 128 may determine that the at least a request for a task performance includes a task performance identifier and generates at least a task performance data element as a function of the task performance identifier. Task performance identifier as used herein may include any information containing information relating to one or more data entry fields describing at least a request for a task performance. Data entry fields may include any of the data entry fields as described above in more detail. Data entry fields may include information containing detailed information about at least a request for a task performance. This may include for example, a description of when a task performance may need to be started or when the task performance needs to be completed. Language processing module 128 may extract task performance identifier using any of the methodologies as described above. This may include for example, generating algorithms and utilizing machine-learning processes as described in more detail below. Language processing module 128 may generate at least a task performance data element utilizing the task performance identifier. Task performance data element as used herein, includes a task description containing a task performance list label and a priority label. Task may include any job that needs to be completed. Job may include any item that a user needs to complete whether relating to a user's personal life, family life, home life, work life, free time activity like, community life, and the like. Job may relate to any facet of a user's life. For example, a job may include a personal job such as mowing user's lawn or a work job such as organizing files for review. In an embodiment, jobs may overlap between different aspects of a user's life. In an embodiment, task performance data element may contain additional information such as a task performance owner.

With continued reference to FIG. 1, language processing module 128 may include a task performance learner 144 configured to generate at least a task performance data element as a function of the task performance identifier. Task performance learner 144 may include any hardware and/or software module. Task performance learner 144 may be designed and configured to generate outputs using machine learning processes. A machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

With continued reference to FIG. 1, task performance learner 144 may be designed and configured to generate at least a task performance data element by creating at least a first machine-learning model 148 relating inputs such as a task performance datum and/or a task performance identifier to outputs that may include at least a task performance data element, such as by using a first training set. Such models may include without limitation model developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, at least a computing device 104, language processing module 128, and/or task performance learner 144 may be configured to receive training data to generate at least a first machine-learning model 148. Training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name and/or a description of a medical condition or therapy may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. In an embodiment, first training set may include a plurality of first data entries, each first data entry including at least a task performance identifier and at least a correlated task performance data element. Such training data may be utilized by task performance learner 144 to generate outputs that include task performance data elements as a function of receiving at least a task performance identifier utilizing the training data and the first machine-learning model 148. In an embodiment, task performance learner 144 may utilize training data to generate outputs such as categorizing requests for task performances. In an embodiment, task performance learner 144 may receive training data including at least a request for task performances and a correlated task performance list. Task performance learner 144 may utilize at least a request for a task performance and associated training data to generate a machine-learning model to assign tasks to task performance lists. Data describing requests for task performances that have been categorized to task performance list may be utilized to update outputs generated by task performance learner 144.

Continuing to refer to FIG. 1, machine-learning algorithm used to generate first machine-learning model 148 may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 1, language processing module 128 may generate task performance data element output using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using first training set; the trained network may then be used to apply detected relationships between elements of task performance identifiers and/or task performance datums and task performance data elements.

With continued reference to FIG. 1, language processing module 128 may contain task performance database 152. Language processing module 128 may extract at least a datum from task performance database 152 using the at least a request for a task performance and generate at least a task performance data element as a function of the at least a datum. Task performance database 152 may include tables containing information relating to a task performance data element as described in more detail below in reference to FIG. 4. In an embodiment, language processing module 128 may extract at least a datum from language database 140.

With continued reference to FIG. 1, system 100 includes a task generator module 156 operating on the at least a server. Task generator module 156 may include any suitable hardware or software module. Task generator module 156 may be designed and configured to generate at least a task performance data element as a function of the at least a task performance datum and containing a task performance list label and a priority label. Task performance list label may include a label including reference to a task performance list that the at least a request for a task performance may be assigned to. Task performance list label may include any of the task performance lists as described above including action list, project list, and/or waiting for list. Details describing task performance list are described in more detail below in reference to FIG. 2. Priority label may include a label describing information pertaining to importance of at least a request for a task performance. Priority label may include any of the labels as described above including a label such as normal when at least a request for a task performance contains no additional importance or high such as when at least a request for a task performance contains additional importance.

With continued reference to FIG. 1, task generator module 156 may include task performance label generator 160. Task performance label generator 160 may generate list label indicating task performance list that request for at least a task performance may be assigned to. Task performance label generator 160 may generate a label such as action when at least a request for a task performance may be assigned to action list. Task performance label generator 160 may generate a label such as project when at least a request for a task performance may be assigned to project list. Task performance label generator 160 may generate a label such as waiting for when at least a request for a task performance may be assigned to waiting for list. In an embodiment, task performance label generator 160 may generate label with information provided by language processing module 128 such as parser 136 and/or language database 140.

Continuing to refer to FIG. 1, task generator module 156 may include priority label generator 164. Priority label generator 164 may generate priority label regarding priority of at least a request for a task performance. Priority label generator 164 may generate a label such as normal when at least a request for a task performance contains no additional importance. Priority label generator 164 may generate a label such as high when at least a request for a task performance contains additional importance. In an embodiment, task performance label generator 160 may generate label with information provided by language processing module 128 such as parser 136 and/or language database 140.

Continuing to refer to FIG. 1, task generator module 156 may include task performance owner generator 168. Task performance owner generator may generate a label indicating owner of at least a request for a task performance. Task performance owner may include an individual who is in charge of giving approval to at least a request for a task performance. Approval may indicate that at least a request for a task performance is complete. Task performance owner generator 168 may generate a label containing a name of an individual who is the task performance owner for at least a request for a task performance. In an embodiment, task performance owner generator 168 may generate label with information provided by language processing module 128 such as parser 136 and/or language database 140.

With continued reference to FIG. 1, system 100 may include a transmission source module 172 operating on the at least a server. Transmission source module 172 may include any suitable hardware or software module. Transmission source module 172 may be designed and configured to transmit the at least a task performance data element containing the task performance datum list label and the priority label to at least a user device 112. User device 112 may include any of the user device 112s as described above.

Figure 2:
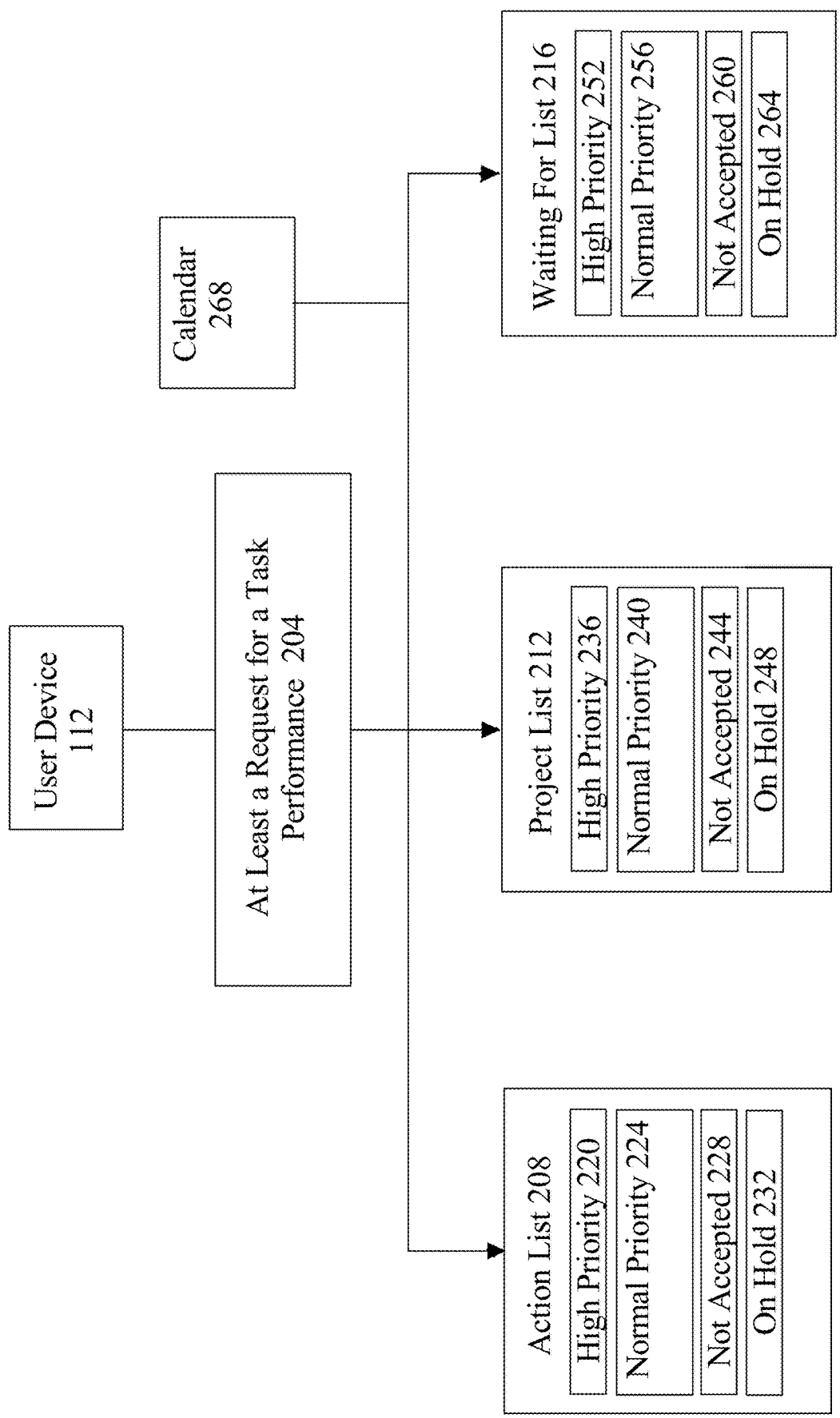
FIG. 2 is a block diagram illustrating an exemplary embodiment of a task performance list.

Referring now to FIG. 2, an exemplary embodiment of task performance lists as displayed to a user such as through GUI 116 is illustrated. Task performance list may include a description as to the category of at least a request for a task-performance. In an embodiment, all requests for at least a request for a task performance 204 may be initially placed onto an uncategorized list. Uncategorized list may include a master list containing all tasks from all users that are unprocessed. Tasks that are unprocessed may include for example tasks that have not yet been assigned to a task performance list. Task performance list may include an action list 208, project list 212, and a waiting for list 216. Action list 208 may include any of the action lists as described above in reference to FIG. 1. Action list may include any actions that a user needs to perform. Action includes any task that does not include sub-task. Task performance list may include a project list 212. Project list 212 may include any of the project lists as described above in reference to FIG. 1. Project list may include any projects that a user needs to perform. Project includes a task that includes at least a sub-task. Task performance list may include a waiting for list 216. Waiting for list 216 may include a list of tasks assigned by a user to other people. Waiting for list 216 may contain an action and/or a project. In an embodiment, each task performance list may be customized to a user whereby action list 208 includes actions only user needs to perform, project list 212 includes projects user is involved with, and waiting for list contains only tasks such as actions and/or projects that user has assigned to others. In an embodiment, tasks such as actions and/or projects may appear on several lists such as when a user has assigned a sub-task of a project to another person and user is also completing a sub-task of the same project. In such an instance, the project would appear on user's project list 212 and the project would also appear on user's waiting for list 216, and the project would appear on the other person's project list 212. In an embodiment, tasks such as actions and/or projects may be mobile and may switched between task performance lists. For example, an action may initially be included on action list 208, and later may have a sub-task added to it, thereby moving it to project list 212. In yet another non-limiting example, a project listed on project list 212 and containing only sub-tasks to be completed by user may also later appear on waiting for list 216 when user assigns a sub-task of the project to another person. In yet another non-limiting example, a project containing only one sub-task that appears on project list 212 may be moved to action list 208 if the sub-task is later completed and/or deleted.

With continued reference to FIG. 2, task performance lists may be further categorized into further lists. In an embodiment, at least a request for a task performance may be received from user device 112 such as by user input such as speech or text via GUI 116. In an embodiment, action list 208 may be categorized into lists based on priority of action list task performances. Action list 208 may include further lists that may include high priority list 220 that may include actions that are of high priority. High priority list 220 may include for example, actions that may have a close due date and/or that are of high value and meaning such as a friend's wedding reception. Normal priority list 224 may include actions that are of regular importance such as everyday tasks or weekly appointments. Action list 208 may also contain a not accepted list 228 that may contain actions that a user has not yet accepted. Action list 208 may also contain an on hold list 232 for actions that are not ready to be performed. Project list 212 may be categorized into lists based priority of project list task performances. Project list 212 may include high priority list 236 that may include projects that are of high priority. High priority list 236 may include for example, projects that may have multiple sub-tasks and/or projects that are complex and take a long time to complete. Normal priority list 240 may include projects that are of regular importance such as projects that may not have an upcoming due date or projects that are not very complex and may not take tremendous amounts of time for a user to complete. Project list 212 may contain not accepted list 244 that may contain projects that a user has not yet accepted. Project list 212 may contain on hold list 248 for projects that will not be performed right away. For example, a project that contains a start date at a later date in the future may be placed on project on hold list 248. Waiting for list 216 may include high priority list 252 which may contain tasks including actions and/or projects that have been assigned to other individuals are of high priority. High priority waiting for list 252 may include for example, complex projects that have multiple sub-tasks that have been assigned to other individuals. Waiting for list 216 may include normal priority list 256 which may include actions and/or projects that are of regular importance and that have been assigned to other individuals. Waiting for list 216 may contain not accepted list 260 which may include tasks that have been assigned to another individual and have not yet been accepted by that individual yet. Waiting for list 216 may include on hold list 264 which may include actions and/or projects that have been put on hold and are not actively pursued at the current moment. In an embodiment, calendar 268 may aid in placing task performances on different task performance lists. For example, at least a request for a task performance received from user device 112 that has a start date three weeks down the road and does not contain any sub-tasks may be placed on action on hold list 232.

Figure 3:
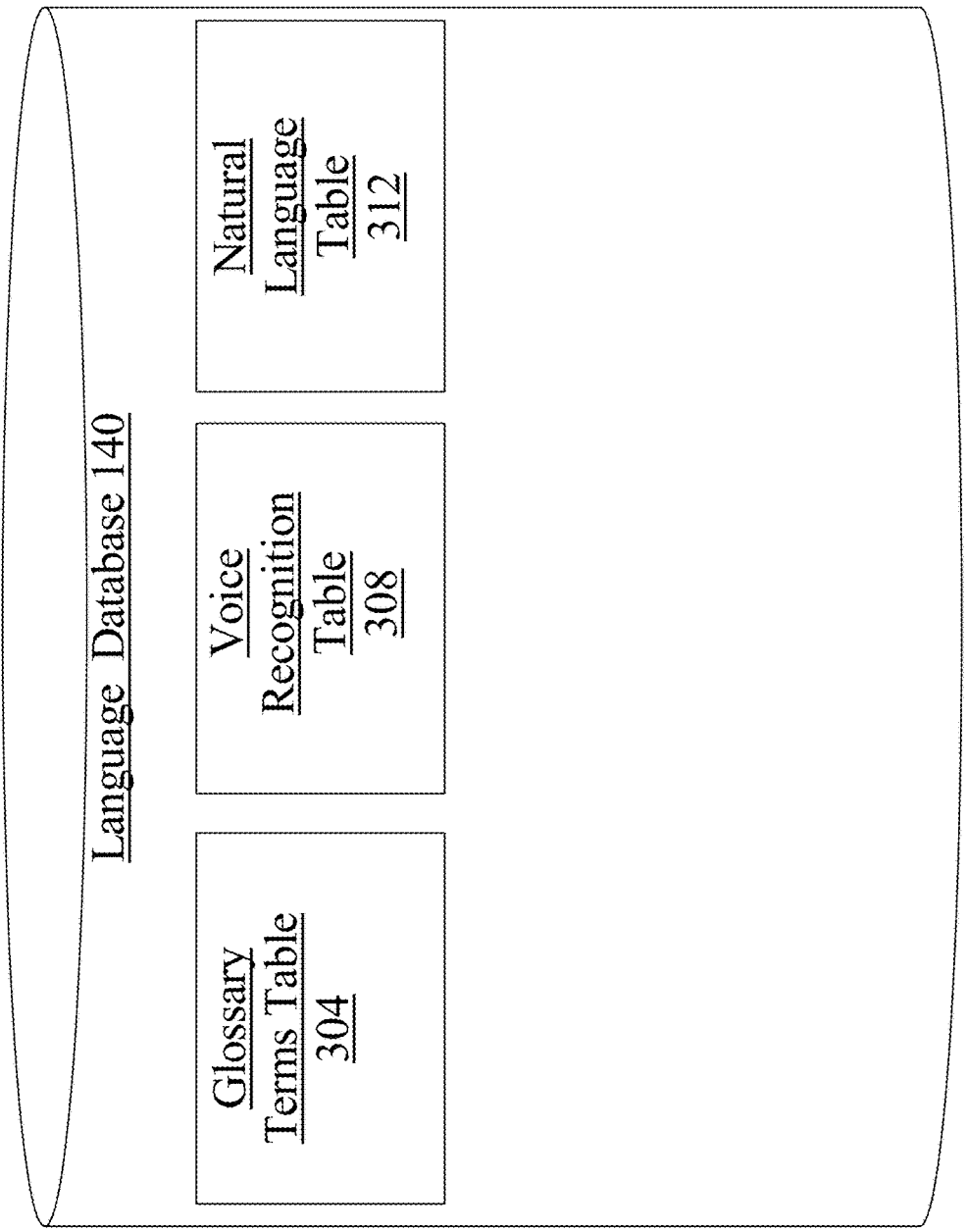
FIG. 3 is a block diagram illustrating an exemplary embodiment of a language database.

Referring now to FIG. 3, an exemplary embodiment of language database 140 is illustrated. Language database 140 may be implemented as any database and/or datastore suitable for use as a database. One or more database tables in task performance database may include glossary term table 304. Glossary term table 304 may contain terms and commands that may be specific to at least a request for a task performance. Glossary term table 304 may contain terms and commands that may be specific to a user and/or a group of users such as co-workers or family members and may not be known by others outside the group and as such may not parse correctly. For example, common adjectives may be dropped from names such as when Frank says drive my car users in the group would know which car belonged to Frank so that at least a request for a task performance that said "drive Frank's car" would not need additional information such as "drive Frank's minivan." Language database 140 may include voice recognition table 308 that may identify spoken commands and associates spoken commands with a user. Voice recognition table 308 may be utilized such as when a user interfaces with GUI 116 through a voice to text option. For example, voice recognition table 308 may be utilized when a user generates at least a request for a task performance such as "mow my lawn" to associate user who commands such a task performance with Sally based on voice recognition of Sally's voice. This may assist a user in having control over generating commands so that users do not impersonate one another. Language database 140 may include a natural language table 312 that may contain information pertaining to meaning of common language terms used in general conversations. In an embodiment, natural language table 312 may comprise multiple specialized, plurally accessible library-type databases. Natural language table 312 may be utilized to understand the contents of the at least a request for a task performance.

Figure 4:
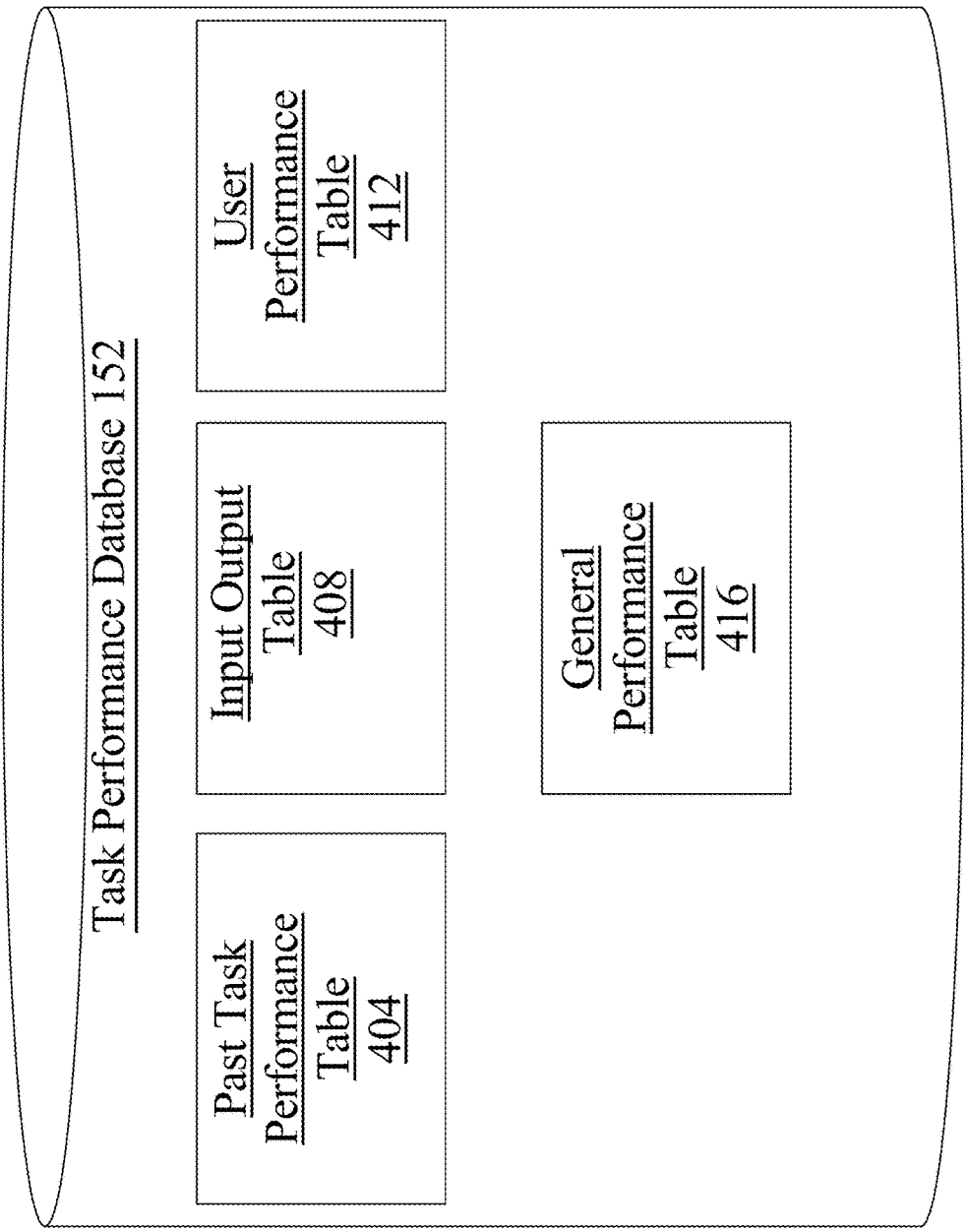
FIG. 4 is a block diagram illustrating an exemplary embodiment of a task performance database.

Referring now to FIG. 4, an exemplary embodiment of a task performance database 152 used by language processing module 128 is illustrated. Language processing module 128 may extract at least a datum from a database using the at least a request for a task performance datum and generate at least a task performance data element as a function of the at least a datum. Task performance database 152 may be implemented as any database and/or datastore suitable for use as a database. One or more database tables in task performance database 152 may include, without limitation, a past task performance table 404; past task performance table 404 may relate at least a request for a task performance to a previously performed past task performance. For example, at least a request for a task performance containing textual data such as "take the trash to the curb on Friday night" may be utilized to consult past task performance table 404 to determine if the same task had been previously performed and who performed the task. In such an instance, past task performance table 404 may include information as to categorization of similar past task performances such as whether taking the trash to the curb was an action and contained no sub-tasks and/or if it was a project and included other sub-tasks. Past task performance table 404 may include information regarding priority of past task performances. For example, a past task performance such as "organize church choir rehearsal" may have previously had a priority label such as normal whereas a past task performance such as "gather nonperishable food for hurricane victims" may have previously had a priority label of high. One or more database tables in task performance database 152 may include, without limitation, an input output table 408; input output table 408 may relate an input such at least a request for a task performance to an output such as a task performance list, a task performance owner and/or a priority label. For example, at least a request for a task performance such as "schedule dentist appoint" may be associated with an action list while at least a request for a task performance such as "organize church picnic" may be associated with a project list because it requires many sub-tasks in order to be completed. One or more database tables in task performance database 152 may include, without limitation, a user performance table 412; user performance table 412 may include information as to tasks such as projects and/or actions that user performs. For example, at least a request for a task performance that includes "mow the lawn" may not be assigned to a task owner such as user if mowing the lawn is not a task contained within user performance table 412. In an embodiment, user performance table 412 may be customized to a user and/or group of users. In yet another non-limiting example, at least a request for a task performance such as "prepare weekly reports" may be assigned to user if preparing weekly reports is included within user performance table 412 as a task user prefers to perform and/or has experience handling. One or more database tables in task performance database 152 may include, without limitation, general performance table 416; general performance table 416 may include information as to qualifications, certifications, skills, and/or standards that a user may need to have achieved in order to be assigned and/or complete at least a request for a task performance. For example, at least a request for a task performance such as "notarize deed for Fred" may not be assigned to a user who is not a notary. In yet another non-limiting example, at least a request for a task performance such as "drive Mark to surgery" may not be performed by a user who is not of legal age to drive a car. The above described tables and entries therein, are provided solely for exemplary purposes. Persons skilled in the art, upon reviewing the entirety of this disclosure, will be aware of various additional examples for tables and/or relationships that may be included or recorded in task performance database consistently with this disclosure.

Figure 5:
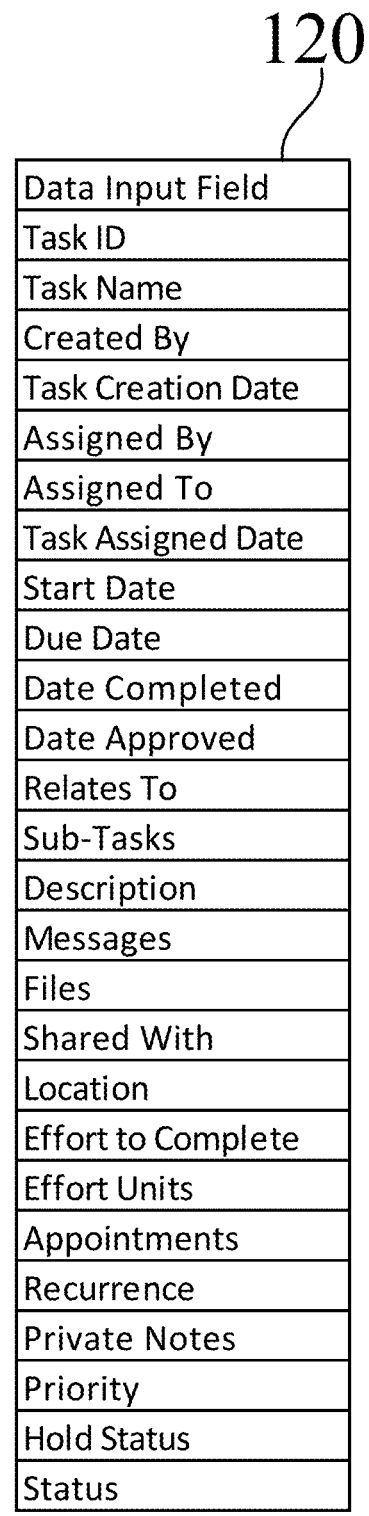
FIG. 5 is a block diagram illustrating an exemplary embodiment of a data input field.

Referring now to FIG. 5, an exemplary embodiments of data input fields contained within user task performance input GUI 120 is illustrated. Data input fields may include information pertaining to at least a request for a task performance as described in more detail above in FIG. 1. In an embodiment, user may enter information into data input fields by typing entries into fields and/or by using a voice to text option such as when a user may be driving a car or a user's hands may be tied up. In an embodiment, data input fields may contain a drop down menu that allows a user to select an option such as by highlighting a selection. Data input fields may include any of the data input fields as described above in FIG. 1, which may include for example, task ID, task name, created by, task creation date, assigned by, assigned to, task assigned date, start date, due date, date completed, date approved, relates to, sub-tasks, description, messages, files, shared with, location, effort to complete, effort units, appointments, recurrence, private notes, priority, hold status, and/or status.

Referring now to FIG. 6, an exemplary embodiment of a screen a user may enter information relating to at least a request for a task performance at GUI 116 is illustrated. In an embodiment, a user may enter information relating to at least a request for a task performance by entering information into data fields by either typing and/or voice to text option. In an embodiment, to create at least a request for a task performance and/or to view information pertaining to at least a request for a task performance user may select within GUI 116 task detail 604. Task detail 604 may contain information about at least a request for a task performance such as title 608, name of individual task has been assigned to 612, name of individual task has been assigned by 616, a description of what the task relates to 620, and/or start date 624 for the task. In an embodiment, task detail 604 may contain data fields that a user can click on and expand to find out more detailed information relating to at least a request for a task performance. This may include a discussion field 628 which may contain a log of all discussions relating to a particular task. In an embodiment, task detail 604 may contain an attachments field that may contain any additional files such as documents and photographs that may relate to a particular task. In an embodiment, task detail 604 may contain a meeting field 636 which may contain a log of all past, present, and/or future appointments relating a particular task. In an embodiment, task detail 604 may contain a recurring 640 field which may allow a user to schedule a task performance on a recurring basis such as an appointment that is held weekly. In an embodiment, task detail 604 may contain a private notes 644 field that may allow a user to enter private notes relating to a task. In an embodiment, private notes 644 may only be viewed by a user who entered private notes unless user grants permission to share private notes 644 with another. In an embodiment, task detail 604 may contain a due date 648 field that may contain information as to when a task needs to be completed by. In an embodiment, task detail 604 may contain a description 652 field which may contain information summarizing a particular task. Task detail 604 may contain data field that a user can select to update information contained within task detail 604, which may include a save 656 button to save any updates or information that a user has entered, a complete 660 button when a task has been completed such as when a task owner grants approval to a task, and a cancel button 664 when a user needs to cancel a change or selection a user has accidentally made.

Figure 7A:
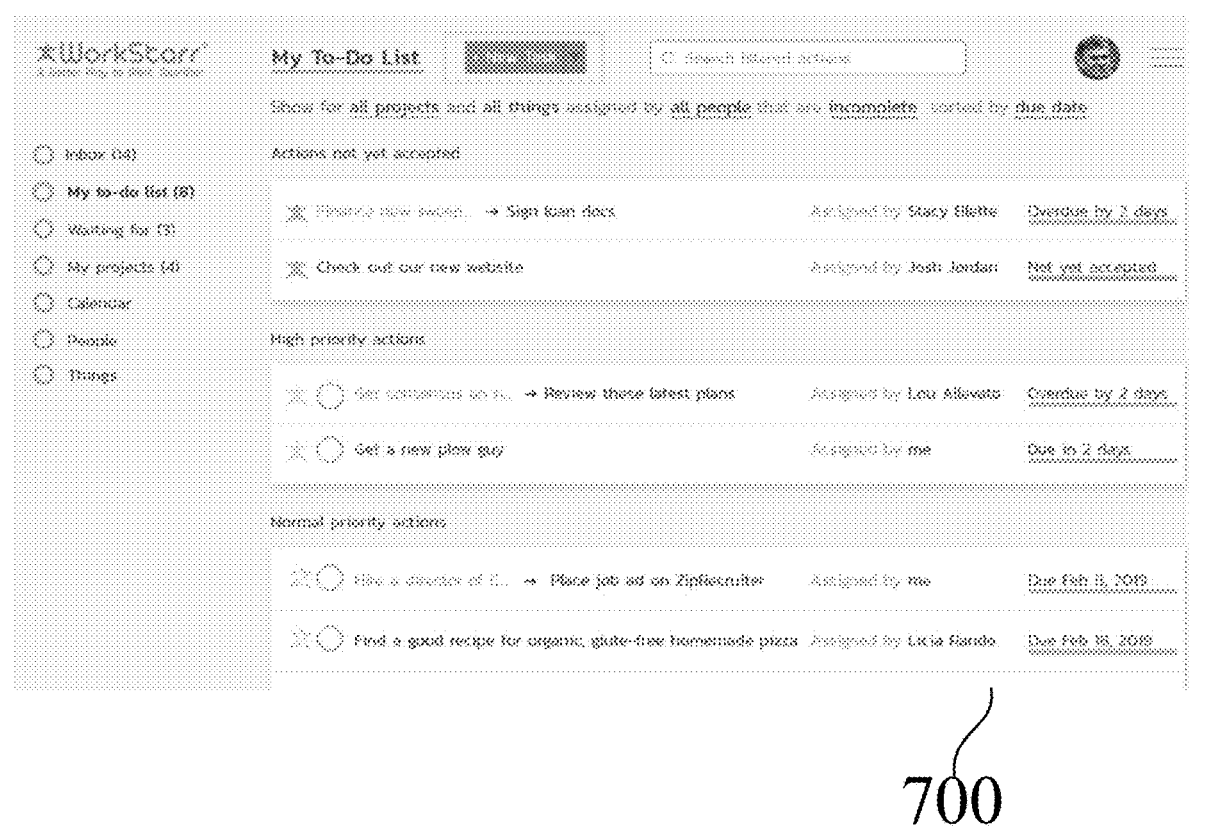
Figure 7B:
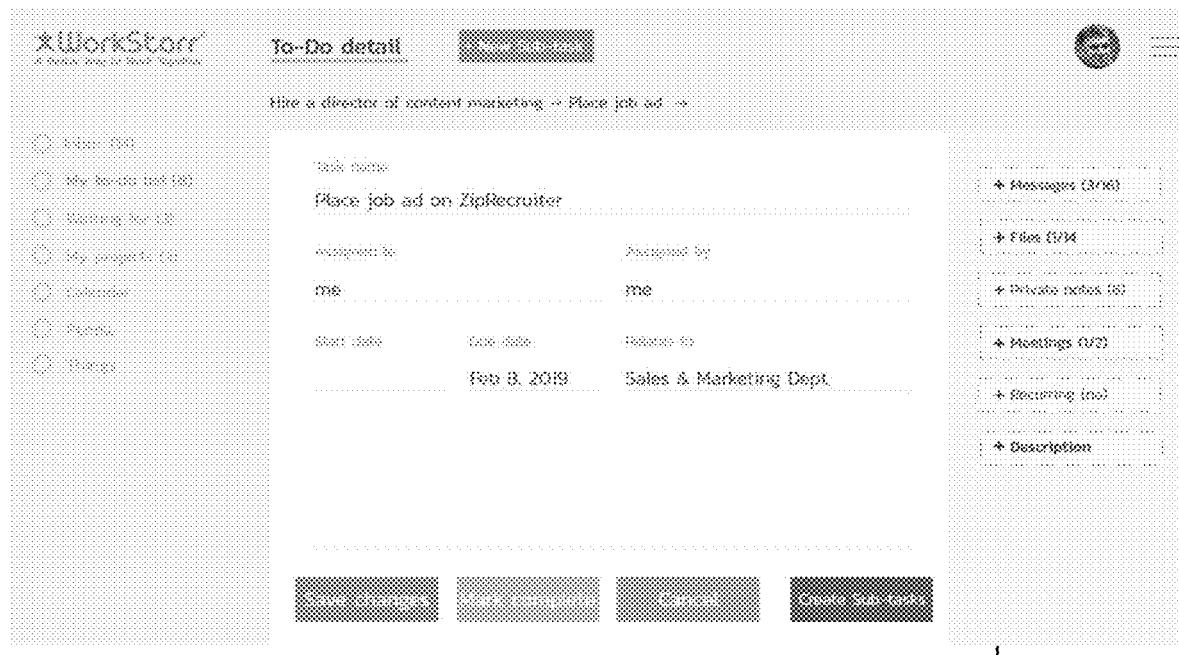
Figure 7C:
Figure 7D:
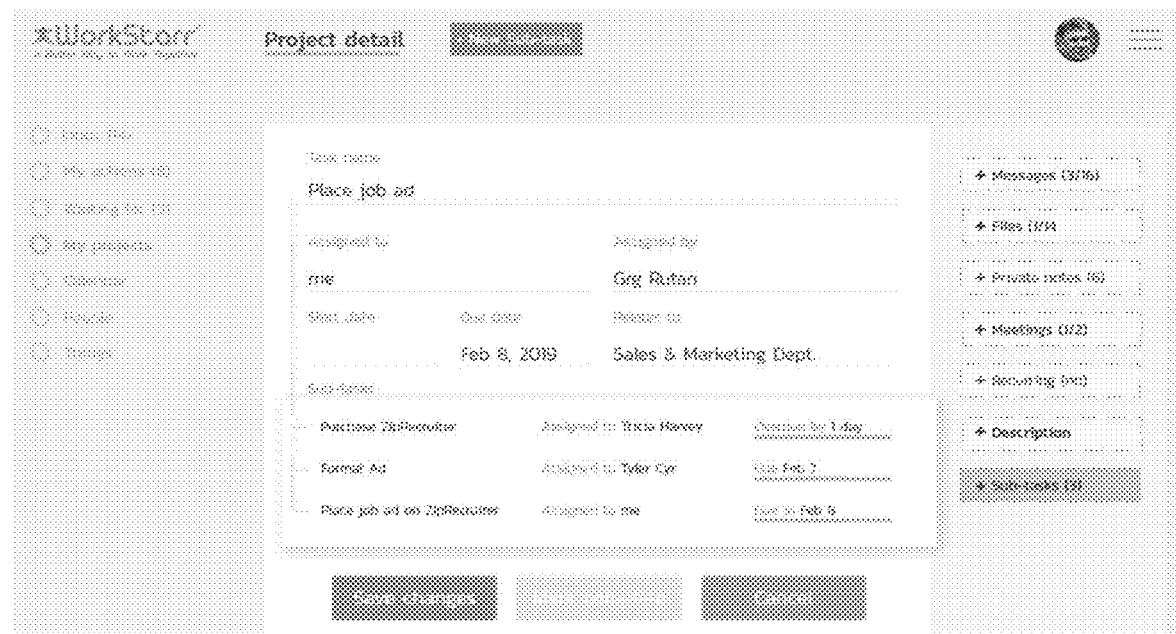
Figure 7F:
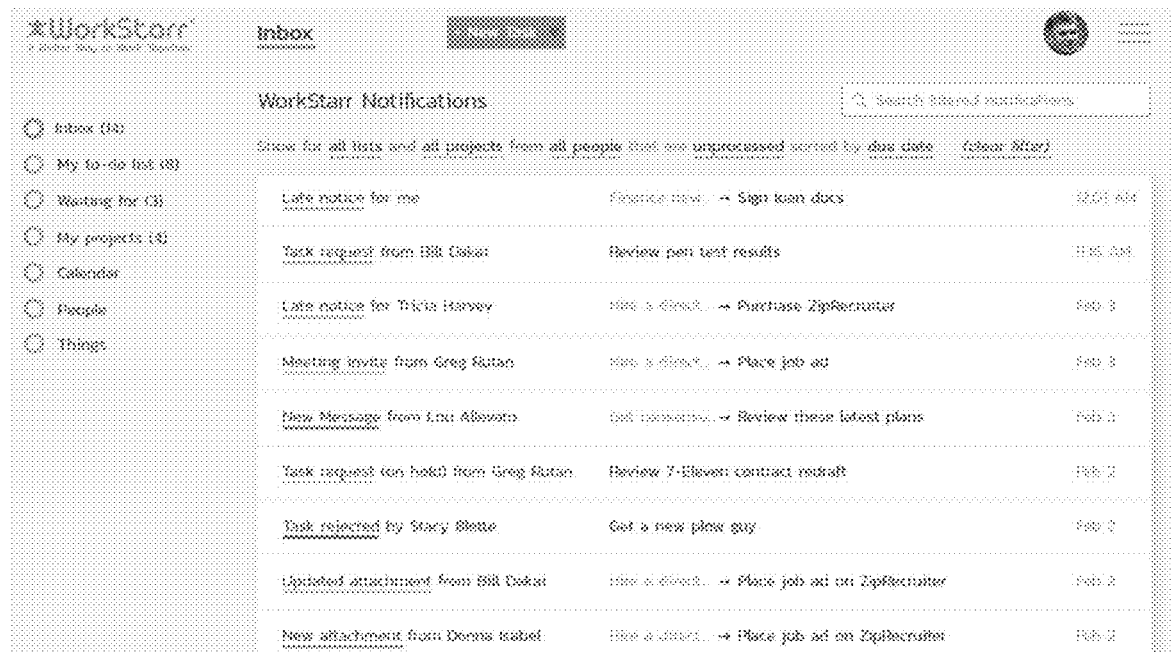

Referring now to FIG. 7A-F screenshots illustrating exemplary embodiments of GUI that a user may interact with and/or use to perform steps and processes in any of the methods described in this disclosure. GUI may function to translate machine-readable data into one or more fields, buttons, or the like into which users may enter commands into as an example, a textual field including any of the textual fields as described above in reference to FIGS. 1-5. For instance, and for illustrative purposes only, FIG. 7A shows a screen containing action list. In an embodiment, actions included on action list may be categorized by priority, with actions not yet accepted listed at the top of the action list, high priority actions listed in the middle of the action list, and normal priority actions listed at the bottom of the action list. In an embodiment, user may navigate to other task performance lists such as project list or waiting for list, as well as other categories such as calendar, people, and things by highlighting one of those options listed on the left side of the screen. FIG. 7B shows a screen containing an action detail where a user can fill in details pertaining to a specific action. For example, a user may fill in specific textual fields such as task name, assigned to, assigned by, start date, due date, and relates to. Action detail may allow a user to attach other materials and files relating to an action as listed on the right side of the screen, such as messages, files, private notes, recurring, and description. In an embodiment, textual fields and/or other materials may include any of the textual fields and/or other materials as described above in reference to FIGS. 1-6. FIG. 7C shows a screen containing project list. In an embodiment, a user may select a specific project contained within project list to expand information to reflect how many sub-tasks a particular project has completed at any given moment. In an embodiment, projects may be listed on project list by most recent projects to be added to project list. FIG. 7D shows a screen containing a project detail where a user can fill in specific textual fields pertaining a project such as task name, assigned to, assigned by, start date, due date, relates to, and sub-tasks. Project detail may allow a user to attach other materials and files relating to an action as listed on the right side of the screen, such as messages, files, private notes, recurring, and description. Project detail may allow a user to see different sub-tasks that comprise a project and see information such as who a particular sub-task has been assigned to as well as when a particular sub-task is due. FIG. 7E shows a screen containing a waiting for list. In an embodiment, waiting for list may be organized by priority, with high priority waiting for tasks listed at the top of the waiting for list, normal priority waiting for tasks listed in the middle of the waiting for list, and on hold waiting for tasks listed at the bottom of the waiting for list. In an embodiment, tasks listed on the waiting for list may contain information such as what person a user is waiting for completed a task listed on the waiting for list, as well as when the task is due. In an embodiment, user may navigate to other task performance lists such as action list or project list, as well as other categories such as calendar, people, and things by highlighting one of those options listed on the left side of the screen. FIG. 7F shows a screen containing an inbox list. Inbox list may contain a list compiling all lists a user may generate to include for example, all projects including actions from all people and which may be sorted by due date. In an embodiment, user may navigate to other task performance lists such as action list, project list, waiting for list, as well as other categories such as calendar, people, and things by highlighting one of those options listed on the left side of the screen.

Referring now to FIG. 8, an exemplary embodiment of a method 800 of textual analysis of task performance datums is illustrated. At step 805 the at least a server receives at least a request for a task performance. Receiving at least a request for a task performance may be performed utilizing any type of network transmission and/or network connection as described herein. At least a request for a task performance may include receiving at least an action. An action may include a task containing no sub-tasks as described in more detail above in reference to FIGS. 1-7. An action may include any of the actions as described above in reference to FIGS. 1-7. At least a request for a task performance may include receiving at least a sub-task. At least a sub-task may comprise a project and may include any of the sub-tasks and/or projects as described above in FIGS. 1-7. At least a request for a task performance may be received from a user device 112. User device 112 may include any of the user device 112s as described above in reference to FIG. 1. At least a request for a task performance may be received from a conversational response. Conversational response may include any of the conversational responses as described above in reference to FIG. 1, including for example emails or messages. Receiving at least a request for a task performance may include receiving at least a task performance file. Task performance file may include any of the task performance files as described above in reference to FIG. 1.

With continued reference to FIG. 8, at step 810 the at least a server parses the at least a request for a task performance to extract at least a task performance datum. Parsing may be performed by any of the methodologies as described above in reference to FIG. 1. Parsing may include normalizing one or more words or phrases contained within at least a request for a task performance, where normalization includes a process whereby one or more words or phrases are modified to match corrected or canonical forms; for instance, misspelled words may be modified to correctly spelled versions, words with alternative spellings may be converted to spellings adhering to a selected standard, such as American or British spellings, capitalizations and apostrophes may be corrected, and the like; this may be performed by reference to one or more "dictionary" data structures listing correct spellings and/or common misspellings and/or alternative spellings, or the like. Parsing may include performing algorithms such as those performed by language processing module 128 as described above in reference to FIG. 1. Parsing may include performing algorithms for name recognition. Name recognition may include a process whereby names of users, family members of users, co-workers of user, friends of users from sports, college, activities and the like are identified; this may include for example by searching for words, phrases, and/or names contained within task performance database 152. For example, language processing module 128 may identify a name contained within at least a request for a task performance, and may consult task performance database 152 to verify if the name is contained within one of the database tables such as if the name is contained within past task performance table 404 because the named user previously performed the task.

With continued reference to FIG. 8, parsing may be performed by extracting and/or analyzing one or more words or phrases by performing dependency parsing processes; a dependency parsing process may be a process whereby language processing module 128 and/or parser 136 recognizes a sentence or clause and assigns a syntactic structure to the sentence or clause. Dependency parsing may include searching for or detecting syntactic elements such as subjects, objects, predicates or other verb-based syntactic structures, common phrases, nouns, adverbs, adjectives, and the like; such detected syntactic structures may be related to each other using a data structure and/or arrangement of data corresponding, as a non-limiting example, to a sentence diagram, parse tree, or similar representation of syntactic structure. In an embodiment, language processing module 128 may be configured, as part of dependency parsing, to generate a plurality of representations of syntactic structure, such as a plurality of parse trees, and select a correct representation from the plurality; this may be performed, without limitation, by use of syntactic disambiguation parsing algorithms such as, without limitation, Cocke-Kasami-Younger (CKY), Earley algorithm or Chart parsing algorithms. Disambiguation may alternatively or additionally be performed by comparison to representations of syntactic structures of similar phrases as detected using vector similarity, by reference to machine-learning algorithms and/or modules.

With continued reference to FIG. 8, parsing may include combining separately analyzed elements from at least a request for a task performance to extract at least a task performance datum; elements may include words, phrases, sentences, or the like, as described above. For instance, two elements may have closely related meanings as detected using vector similarity or the like; as a further non-limiting example, a first element may be determined to modify and/or have a syntactic dependency on a second element, using dependency analysis or similar processes as described above. Combination into at least a task performance datum may include, without limitation, concatenation. Alternatively or additionally, parsing may include detecting two or more elements in a single request for at least a task performance; for instance, parsing module may extract a conversational response and a user device response.

With continued reference to FIG. 8, parsing may include converting at least an element into at least a task performance datum for instance, and without limitation, once an element has been detected, parsing may convert it to a highly closely related task performance datum based on vector similarity, where the highly closely related element is labeled as a standard form or canonical element. Parsing may be performed by parser 136 as described in more detail above in FIG. 1. In an embodiment, converting to a standard form element may enable more efficient processing of element, as a reduced space of potential elements may be used to retrieve at least a task performance datum. In an embodiment, a datum may be retrieved from a database such as language database 140 and/or task performance database 152.

With continued reference to FIG. 8, parsing may extract at least a task performance datum. Task performance datum may include any of the task performance datums as described above that may include relevant information relating to the at least a request for a task performance. Relevant information may include for example information pertaining to a category of at least a request for a task performance, priority of the at least a request for a task performance and/or at least a task performance owner. For example, task performance datum may include information such as a high priority label given to at least a request for a task performance datum such as "terminate John's position on Monday." In yet another non-limiting example, task performance datum may include information such as "Billy will be task owner."

With continued reference to FIG. 8, at step 815 the at least a request for a task performance is categorized to at least a task performance list. Task performance list may include any of the task performance lists as described above in FIGS. 1-7. Categorizing the at least a request for a task performance may include assigning at least a request for a task performance to at least a task performance list. In an embodiment, at least a request for a task performance may be initially categorized into an uncategorized list, as described above in more detail in FIG. 2. Subsequently, at least a request for a task performance may be assigned to a task performance list including action list, project list, and/or waiting for list as described above in more detail in FIGS. 1-7. In an embodiment, at least a request for a task performance may be initially assigned to a task performance list such as action list because it does not contain any sub-tasks, but may be later moved to another list such as to project list when a sub-task is added.

With continued reference to FIG. 8, at step 820 the at least a request for a task performance is assigned to at least a task performance owner. Task performance owner as used herein includes the name of the individual who has been granted authority to grant approval to a task and mark it as complete. In an embodiment, task performance owner may or may not be the individual who may be completing a task. For example, John may generate an action that he will assign to Mary to complete, but John may still be named as the task owner because he will be in charge of granting approval to the task and ensuring that Mary has completed the task to his satisfaction. In an embodiment, task owner may be granted certain privileges such as delaying tasks and placing tasks on hold under the task owner decides to release the task.

With continued reference to FIG. 8, at step 820 the server generates at least a task performance data element as a function of the at least a task performance datum and containing at least a task performance list label and a priority label. Task performance list label may include a label indicating the task performance list that the at least a request for a task performance has been assigned to. For example, at least a request for a task performance that has been assigned to action list may contain a task performance list label that includes "action list." Priority label may include a label indicating importance of at least a request for a task performance. For example, at least a request for a task performance that has been deemed of additional importance because it needs to be completed quickly or is of great value to a company, may include a priority label that includes "high priority."

With continued reference to FIG. 8, the at least a task performance data element containing the task performance label and the priority label may be transmitted to at least a user device. User device may include any of the computing devices as described herein. Transmitting may include sending the task performance data element over a network connection and may be implemented, without limitation, as described herein.

Figure 9:
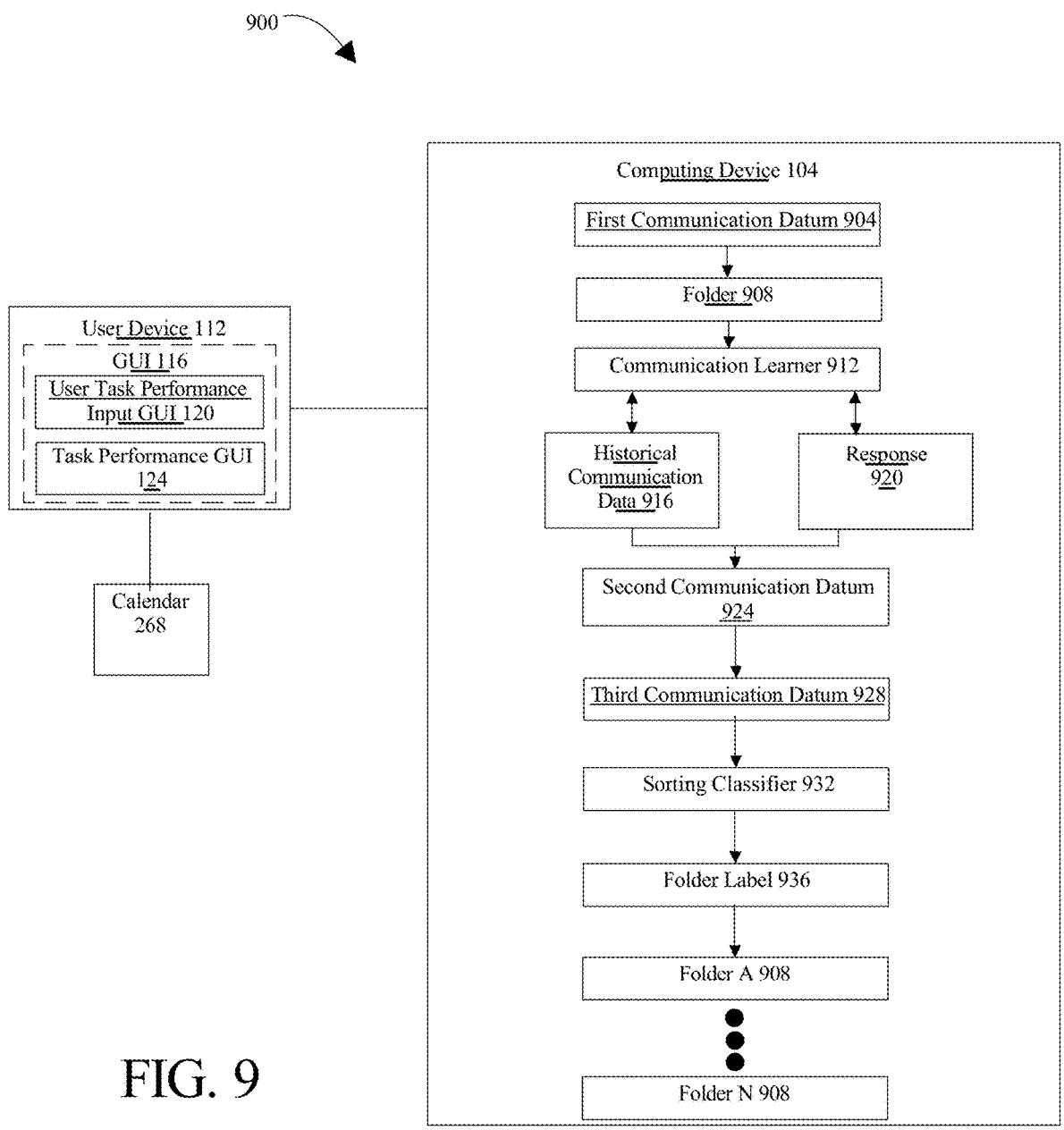
FIG. 9 is a flow diagram illustrating an exemplary embodiment of a system for processing electronic communications.

Referring now to FIG. 9, an exemplary embodiment of a system 900 for processing electronic communications is illustrated. System 900 includes a computing device 104. Computing device 104 includes any computing device 104 as described above in more detail in reference to FIG. 1. Computing device 104 is configured to receive a first communication datum 904. A "communication datum," as used in this disclosure, is an electronic communication sent by a sender to a recipient. In an embodiment, the sender and the recipient may be same person. In an embodiment, the sender and the recipient may be different persons. A communication datum 904 may include but is not limited to electronic communications such as electronic mail, email, e-message, chat message, a voice mail, text message, direct message, instant message, and the like. For example, a communication datum 904 may include an email message generated by a sender such as a first co-worker and transmitted to a recipient such as a second co-worker. In yet another non-limiting example, a communication datum 904 may include a text message sent by a mother to her daughter. A first communication datum 904 may relate to a task performance, including any of the task performances as described herein, and/or a subtask. Computing device 104 locates a folder 908 relating to first communication datum 904 and a task performance. A "folder," as used in this disclosure, is a group of communication datums. A folder 908 may be used to store and/or archive communication datums 904 that may be related to one another and/or a task performance. In an embodiment, a folder 908 may include an electronic mailbox and/or a portion of an electronic mailbox. In an embodiment, computing device 104 may generate a folder 908 for a task performance. For example, computing device 104 may generate a first folder 908 for a first task performance such as hiring a nanny, and a second folder 908 for a second task performance such as booking a vacation to Hawaii. Computing device 104 may locate a folder 908 relating to first communication datum 904 and a task performance. For instance and without limitation, a first communication datum 904 may relate to a list of groceries that a user is running low on and may run out of in the next upcoming days. In such an instance, computing device 104 may locate a folder 908 relating to a task of grocery shopping. Folder 908 may store information relating to previous items a user may have purchased at a grocery store, what budget a user has set for previous grocery shopping trips, and the like.

With continued reference to FIG. 9, computing device 104 is configured to examine a folder 908 and identify an outstanding task performance. An "outstanding task performance," as used in this disclosure, is a task performance that has not yet been completed. An outstanding task performance may contain one or more entries located within action list 208, project list 212, and/or waiting for list 216. For example, an outstanding task performance may include a task for cleaning out the user's garage, which has not yet been completed. In yet another non-limiting example, an outstanding task performance may include a task that has been partially started, but is not yet completely finished, such as a user who has written a first draft of a science report, but still needs to complete a final review of the first draft, along with some editing. Computing device 104 generates a reminder relating to an outstanding task performance. A "reminder," as used in this disclosure, is a prompt that alerts a user to an outstanding task performance. A prompt may include but is not limited to, an audiovisual display, an auditory alert, a mechanical alert such as a vibration and the like. For instance and without limitation, computing device 104 may examine a folder and identify an outstanding task performance, such as ordering coffee, which has been outstanding and overdue for at least 3 days. In such an instance, computing device 104 generates a reminder and displays a message within computing device 104, reminding a user to reorder coffee.

With continued reference to FIG. 9, computing device 104 is configured to generate a communication learner 912. Communication learner may be designed and configured to generate outputs using machine learning processes, including any of the machine-learning processes as described herein. Communication learner 912 uses historical communication data 916 as an input and outputs a response, using a first machine-learning process. "Historical communication data," as used in this disclosure, is any previous conversations, remarks, and/or replies generated by a user. Historical communication data 916 may be obtained from a previous historical communication datum, including but not limiting to a communication datum contained within electronic mail, email, e-message, chat message, a voice mail, text message, direct message, instant message, and the like. For instance and without limitation, a historical communication datum 916 may include a previous email response that a user drafted and sent to a contact, such as the user's co-worker. Communication learner 912 outputs a response 920, using a first machine-learning process. A "response," as used in this disclosure, is an answer output by communication learner 912. A response 920 may include a communication. A communication may include an answer generated in response to a first communication datum 904. An "answer" as used in this disclosure, is any reply remark to a first communication datum 904. An answer may include a reply such as a textual response, an email response, a text message reply, and the like. For instance and without limitation, a first communication datum 904 may include an email containing a remark seeking to confirm a dinner reservation for later that evening. Communication learner 912 outputs a response 920 as a function of generating communication learner 912. Communication learner 912 may generate a response 920 that generates a communication such as a subsequent email containing an answer, confirming the dinner reservation for later that evening, using prose and style of previous user responses. A response may include a command. A "command," as used in this disclosure, is a subsequent step and/or activity, instructing computing device 104 what to do next. A subsequent step may include locating an additional folder, reviewing a subsequent task performance, and the like.

With continued reference to FIG. 9, computing device 104 is configured to identify a second communication datum 924 as a function of response 920. A "second communication datum," as used in this disclosure, includes anything suitable for use as first communication datum 904 as described above in more detail. Computing device 104 may identify a second communication datum 924 using information contained within response 920. For example, response 920 may identify a particular folder 908 where second communication datum 924 may be located. In yet another non-limiting example, response 920 may contain second communication datum 924. Computing device 104 may select a second communication datum 924 using a task performance, including any subtasks and/or actions. For instance and without limitation, first communication datum 904 may relate to a task performance such as an upcoming graduation party. Computing device 104 may identify a second communication datum 924 that relates to the upcoming graduation party, such as a sub-task that includes ordering balloons. Such information may then be organized and stored together in folder 908 relating to the task performance of graduation party. Computing device 104 generate a reply relating to second communication datum 924. A "reply," as used in this disclosure, is an answer and/or response generated relating to second communication datum 924. A reply may include generation of a task performance. Computing device 104 retrieves a device identifier contained within folder 908. A device identifier may identify a user and/or third-party that a reply is intended for. Computing device 104 transmits a reply to a device as a function of a device identifier. A device may include any device suitable for use as user device 112. Transmission may occur using any network methodology as described herein. For instance and without limitation, a reply may be generated for a user's mother based on a second communication datum 924 such as an email, asking the user to pick up the mother's dry cleaning. Computing device 104 generates a reply relating to second communication datum 924, such as a message that informs the user's mother that the user will pick up the dry cleaning. Computing device 104 retrieves a device identifier contained within folder 908 and transmits a reply to the device. Computing device 104 may generate a reply by parsing historical communication data 916 to identify a reply element. Parsing may be performed using any of the methods as described above in more detail in reference to FIGS. 1-8. A "reply element," as used in this disclosure, is a signature style of a user when replying to communication datums. A reply element may include a particular prose of language, use of language, formatting style, word choice, diction, nature of response, and the like. Computing device 104 generates a reply as a function of a reply element. For instance and without limitation, computing device 104 may parse historical communication data 916, and identify a reply element such as a user's frequent use of poetic prose, when drafting emails. In such an instance, computing device 104 generates a reply using poetic prose.

With continued reference to FIG. 9, computing device 104 is configured to update folder 908 to include second communication datum 924. Updating may include storing second communication datum 924 within folder 908. Updating may include identifying a task performance and/or a subtask relating to second communication datum 924. For example, computing device 104 may identify a task performance and/or a subtask such as buying a birthday present for John which relates to second communication datum 924 which contains an email asking John what he would like for his birthday. In such an instance, computing device 104 may store second communication datum 924 within folder 908 as a function of a task performance and/or a subtask. In an embodiment, communication datums may be stored within folder 908 and organized by task performance.

With continued reference to FIG. 9, computing device 104 may receive a third communication datum 928, whereby third communication datum 928 may include any item suitable for use as first and/or second communication datum as described above in more detail. Computing device 104 generates a sorting classifier 932. A "classifier," as used in this disclosure, is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric or the like. Sorting classifier 932 may be generated using a classification algorithm, defined as a process whereby computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Sorting classifier 932 uses a communication datum as an input, and outputs a folder label 936. A "folder label 936," as used in this disclosure, is a category describing the contents of communication datums contained within folder 908. For instance and without limitation, a folder label 936 may categorize the contents of a folder 908 containing communication datums relating to medical appointments and medical procedures as "medical." In yet another non-limiting example, a folder label 936 may categorize the contents of a folder 908 containing communication datums relating to a series of various volunteer project as "volunteer work." A folder label 936 may indicate and/or describe a task performance and/or subtask that a folder 908 may relate to. For instance and without limitation, a folder label 936 may specify a folder 908 as relating to dry cleaning, for all communication datums stored within the folder 908 that relate to a user's dry cleaning including previous dry cleaning receipts, clothes that a user gets dry cleaned, how much money a user typically spends on dry cleaning and the like. Computing device 104 generates a folder label 936 for third communication datum 928 as a function of sorting classifier 932. Computing device 104 locates a folder as a function of a folder label 936, and stores third communication datum 928 within the folder. In an embodiment, computing device 104 may match a folder label 936 to a folder. For example, a folder label 936 specifying "fitness" may be used to locate a folder that contains communication datums relating to fitness. In an embodiment, parser 136 may be utilized to locate a folder containing communication datums relating to fitness. Computing device 104 may generate a folder label 936 as a function of a task performance. For example, folder 908 may contain a plurality of communication datums relating to a task performance such as gardening a user's lawn. In such an instance, the task performance of gardening a user's lawn may be used to generate a folder label 936 that specifies "gardening."

Figure 10:
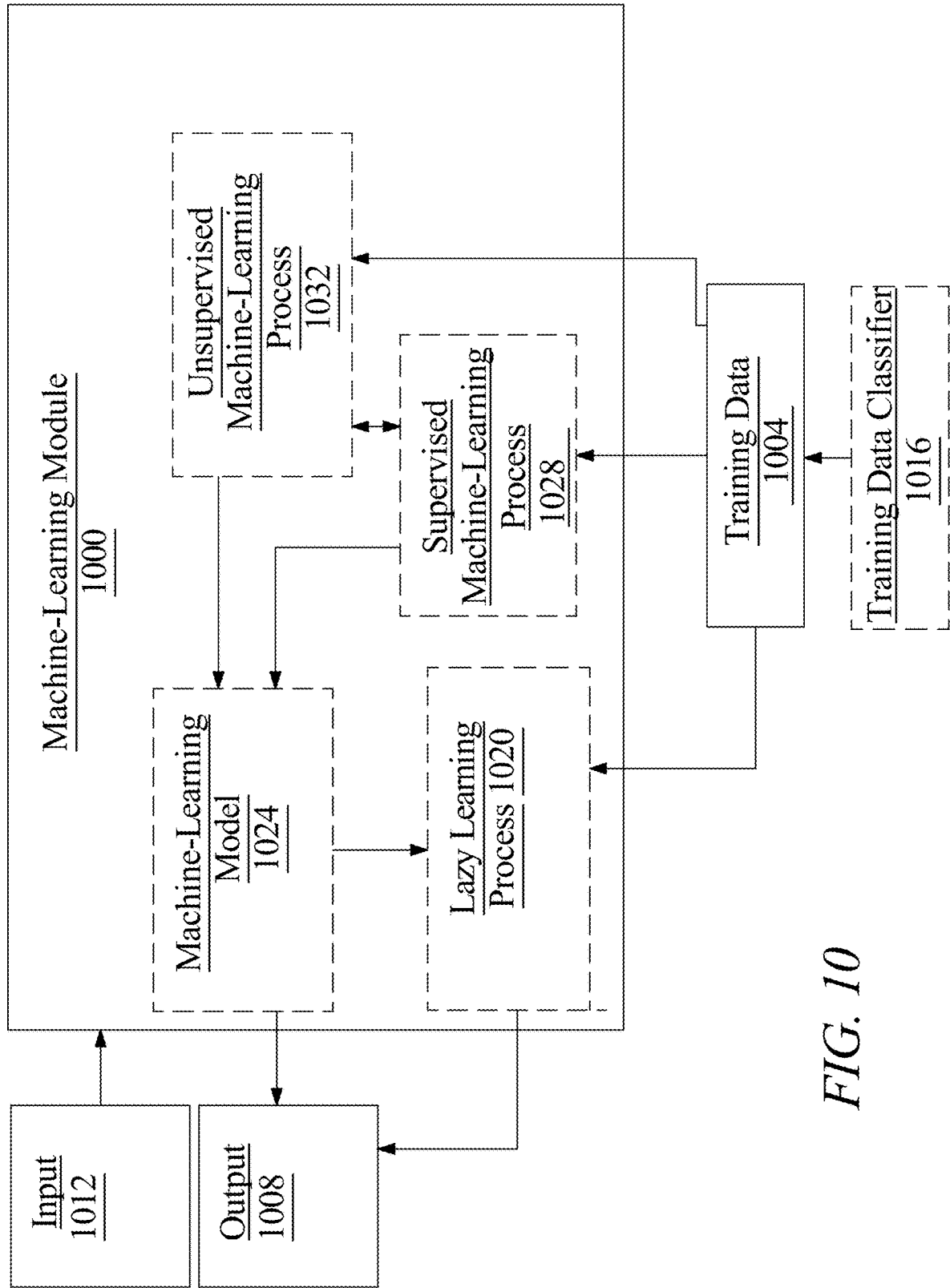
FIG. 10 is a block diagram illustrating an exemplary embodiment of a machine learning module.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example, communication learner 912 may utilize historical communication data 916 as an input, and output response 920, as described above in more detail.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1016 may classify elements of training data based on dates and/or time of when historical communication data 916 was captured. For instance and without limitation, historical communication data 916 captured during a specific time period, such as over the course of several months and/or years may be captured. In yet another non-limiting example, historical communication data 916 captured between communications between a user and certain individuals and/or contacts or groups of contacts may be captured. In such an instance, historical communication data 916 may be captured between a user and all of a select group of a user's co-workers that a user routinely works with.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs such as historical communication data 916 as described above as inputs, response 920 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 10, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 1004.

Figure 11:
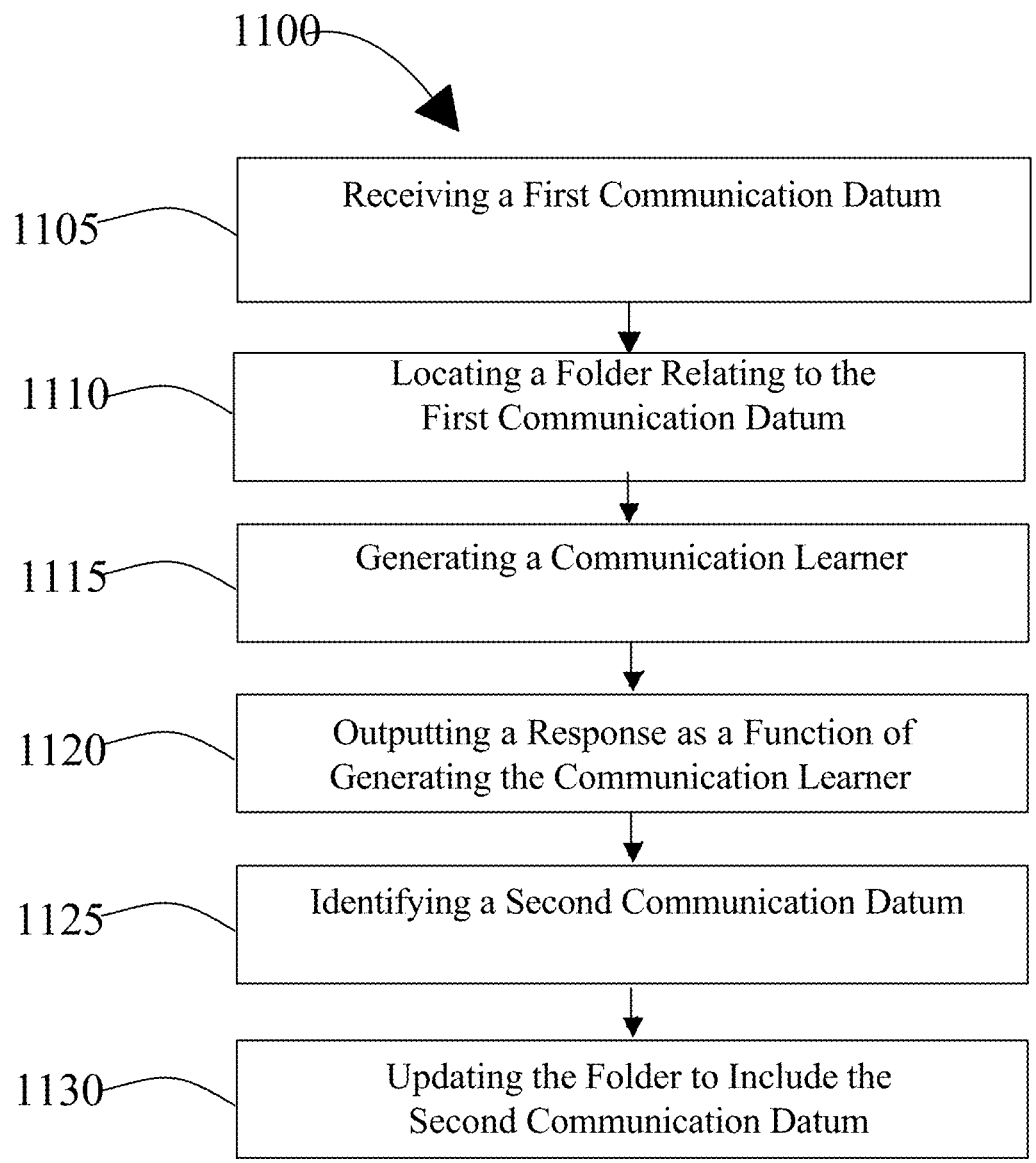
FIG. 11 is a flow diagram illustrating an exemplary embodiment of a method of processing electronic communications.

Referring now to FIG. 11, an exemplary embodiment 1100 of a method of processing electronic communications is illustrated. At step 1105, computing device 104 receives a first communication datum 904. First communication datum 904 includes any of the communication datums 904 as described above in more detail in reference to FIG. 9. A communication datum 904 includes an electronic communication sent by a sender to a recipient, including but not limited to electronic mail, email, e-message, chat message, a voice mail, text message, direct message, instant message, and the like. Computing device 104 receives a first communication datum 904 utilizing any network methodology as described herein.

With continued reference to FIG. 11, at step 1110, computing device 104 locates a folder 908 relating to first communication datum 904 and a task performance. Folder 908 includes any of the folders as described above in more detail in reference to FIG. 9. Folder 908 may include an electronic mailbox and/or a portion of an electronic mailbox, such as a sub-folder used to organize, collect, and store communication datums relating to a particular topic, event, matter, subject and the like. Folder 908 may relate to a task performance, a plurality of task-performances, and/or a subtask as described herein. For instance and without limitation, folder 908 may contain all information including communication datums, historical data, current email exchanges and the like relating to all task performances that relate to tasks a user completes in a user's personal life. In yet another non-limiting example, folder 908 may contain all communication datums relating to a task performance such as lawnmowing. Computing device 104 may locate a folder 908 relating to first communication datum 904 such as by using parser 136. For example, a first communication datum 904 that relates to a science fair project may be used to locate a folder 908 containing other communication datums relating to the science fair project. In yet another non-limiting example, first communication datum 904 that relates to a traffic study for a work related project may be used to locate a folder 908 containing other communication datums relating to the traffic study. Computing device 104 may examine folder 908 and identify an outstanding task performance. Examining a folder 908 may include using parser 136 to determine due date of task performances stored within folder 908, to evaluate and determine which task performances may be overdue. In an embodiment, an overdue task performance may be labeled as such and stored within folder 908. For instance and without limitation, a task performance such as finding a new recipe for organic gluten free pizza may be stored within a folder 908 relating to cooking, and whereby the task for finding the new recipe may be overdue by three days, and identified as such within folder 908. An outstanding task performance includes any of the outstanding task performances as described above in more detail. For example, an outstanding task performance may contain an overdue project and/or action needed to complete a task performance. Computing device 104 may generate a reminder relating to an outstanding task performance. A reminder includes any of the reminders as described above in more detail. For example, a reminder may include an alert such as a textual output, displaying to the user a message prompting the user to remember that a task performance such as gardening flowerbeds is overdue and has not yet been completed.

With continued reference to FIG. 11, at step 1115, computing device 104 generates a communication learner 912. Communication learner 912 includes any of the communication learners 912 as described above in more detail in reference to FIG. 9. Communication learner 912 uses historical communication data 916 as an input, and outputs a response 920, using a first machine learning process. Historical communication data 916 includes any of the historical communication data 916 as described above in more detail. For example, historical communication data 916 may contain previous conversations, remarks, and/or replies generated by a user, such as previous emails, prior conversations, prior decisions, prior answers, and the like. Communication learner 912 generates a first machine learning process, including any of the machine learning processes as described above in more detail in reference to FIGS. 1-10.

With continued reference to FIG. 11, at step 1120, communication learner 912 outputs a response 920, which contains an answer. Response 920 may include a communication, including any of the communications as described above in more detail in reference to FIG. 9. Response 920 may include a command, including any of the commands as described above in more detail in reference to FIG. 9. Computing device 104 receives an input containing a plurality of historical communication data inputs. This may be performed utilizing any of the methodologies as described herein. Computing device 104 creates a communication training set. Communication training set contains a plurality of data entries containing historical communication data correlated to respective responses. Computing device 104 may create communication training set using any of the methodologies as described above in more detail in reference to FIGS. 9-10. Computing device 104 trains communication learner 912, using communication training set.

With continued reference to FIG. 11, at step 1125 computing device 104 identifies a second communication datum 924 as a function of response 920. Second communication datum 924 includes any communication datum as described above in more detail. Computing device 104 may identify second communication datum 924, such by examining folder 908. For instance and without limitation, computing device 104 may generate a query and search folder 908 to identify second communication datum 924 that relates to first communication datum 904. For instance and without limitation, a first communication datum 904 relating to an upcoming birthday party may be used to identify a second communication datum 924 that relates to a cake flavor for the upcoming birthday party. Computing device 104 may generate a reply relating to second communication datum 924. A reply includes any of the replies as described above in more detail above. A reply may include an answer and/or response generated relating to second communication datum 924. In an embodiment, a reply may include generation of a task performance, and may include generation of an action and/or a project. Computing device 104 retrieves a device identifier contained within folder 908 and transmits a reply to a user device as a function of the device identifier. For instance and without limitation, second communication datum 924 may relate to the selection of various menu items from a restaurant that a user would like to order for an upcoming holiday party. Computing device 104 may generate a reply identifying the menu items the user seeks to order, and locate a device identifier contained within folder 908, for the device operated by the restaurant. In such an instance, computing device 104 transmits the reply to a device as a function of the device identifier. Computing device 104 may generate a reply by parsing historical communication data 916 to identify a reply element. A reply element includes any of the reply elements as described above in more detail in reference to FIG. 1. In an embodiment, a reply element may contain a particular communication style and/or prose that a user employs when generating messages such as responses to emails or text messages. In yet another non-limiting example, a reply element may contain a standard response and/or reply that a user employs for certain messages and/or answers. For instance and without limitation, a reply element may identify that a user on average orders a medium iced coffee from the same coffee shop every morning. In such an instance, computing device 104 may generate a reply instructing the user's secretary to order the user a medium iced coffee.

With continued reference to FIG. 11, at step 1130, computing device 104 updates folder 908 to include second communication datum 924. Updating my include storing second communication datum 924 within folder 908. In an embodiment, computing device 104 may store second communication datum 924 together with first communication datum 904. In such an instance, first communication datum 904 and second communication datum 924 may relate to a task performance, an action, a project, and the like, and may contain a label and/or indicator identifying the task performance, action, and/or project that both relate to. For instance and without limitation, first communication datum 904 may relate to a first task performance such as grocery shopping, and second communication datum 924 may relate to a second task performance such as locating recipes that a user wishes to cook over the course of an upcoming week. In such an instance, first communication datum 904 and second communication datum 924 may both relate to nourishment and nutrition. Updating folder 908 may include identifying a task performance relating to second communication datum 924 and storing second communication datum 924 within folder 908 as a function of the task performance. For instance and without limitation, computing device 104 may identify a task performance such as picking up dry cleaning, which relates to second communication datum 924 which includes an email reminding a user that the user's dry cleaning is ready for pickup. In such an instance, computing device 104 may store the second communication datum 924 and task performance together within folder 908.

With continued reference to FIG. 11, computing device 104 may receive a third communication datum 928. A third communication datum 928 includes any communication datum as described herein. Computing device 104 generates a sorting classifier 932, which uses a communication datum as an input and outputs a folder label 936. Sorting classifier 932 may be implemented as any classifier as described herein. Sorting classifier 932 may utilize third communication datum 928 as an input, and outputs a folder label 936 for third communication datum 928. In an embodiment, a folder label 936 may identify the contents of a folder, and/or the theme and/or focus of a folder and/or third communication datum 928. For instance and without limitation, a folder label 936 may identify a third communication datum 928 as relating to health and wellness of a user, when a third communication datum 928 identifies an outstanding task to reschedule a personal training session. In an embodiment, a folder label 936 may be generated as a function of a task performance, such as when third communication datum 928 relates to a task performance. A folder label 936 includes any of the folder label 936s as described above in more detail. Computing device 104 locates a folder as a function of a folder label 936, and stores third communication datum 928 within the folder. This may be performed utilizing any methodologies as described herein.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
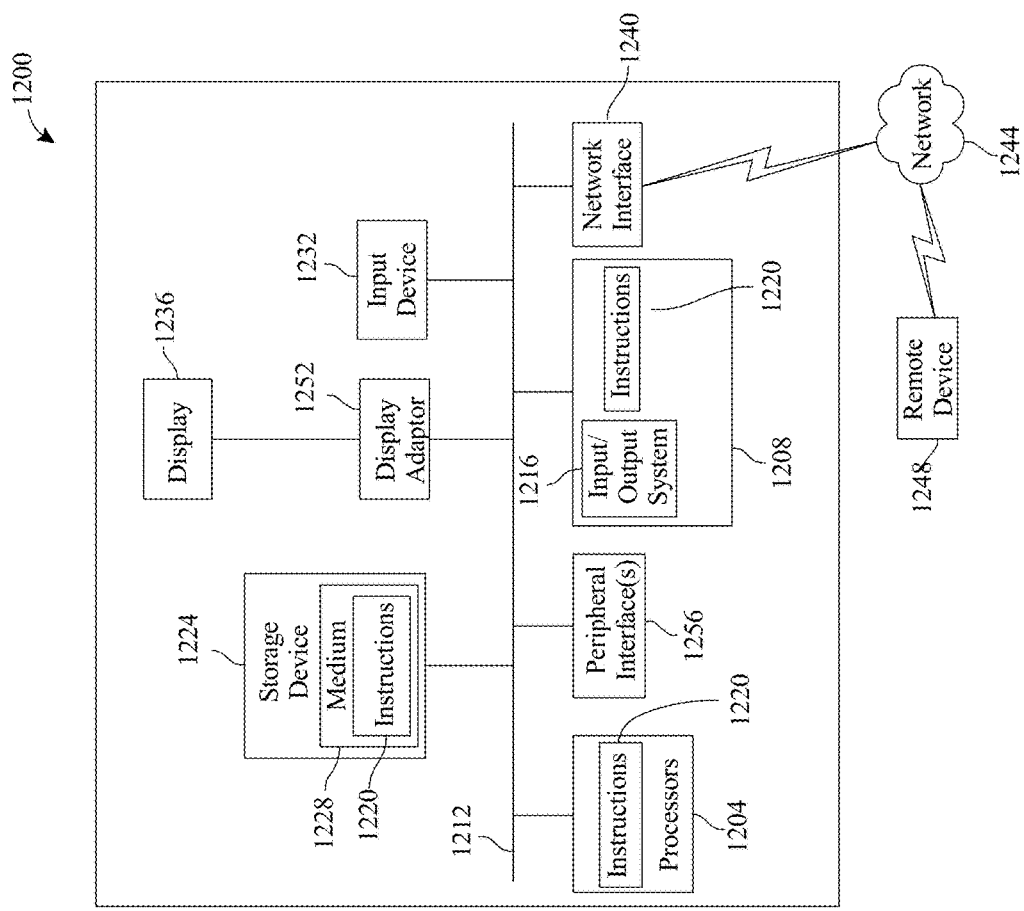
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 13124 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for processing electronic communications into correctly generated folders wherein the correctly generated folders further include responses generated by a communication learner, the system comprising:
　a computing device, the computing device configured to:
　　receive a first communication datum from a user device belonging to a user;
　　generate a folder relating to the first communication datum and a task performance, wherein generating the folder comprises using a language processing module comprising an application programming interface containing communication protocols between the user device, the language processing module, and the communication learner, wherein the language processing module is configured to:
　　　parse at least a request for a task performance and retrieve at least a task performance datum, wherein the task performance datum includes a number of subtasks; and
　　　categorize the at least a request for a task performance to at least a task performance list;
　　generate the communication learner, wherein generating the communication learner comprises generating a first machine-learning model configured to use historical electronic communication data as an input and output a response related to a task performance of the task performance list, wherein generating the first machine-learning model comprises:
　　　capturing historical electronic communication training data from historical electronic communications between the user and contacts of the user;
　　　creating a communication training set as a function of the historical electronic communication training data, wherein the communication training set contains a plurality of data entries containing the historical electronic communication training data correlated to respective responses; and
　　　training the communication learner as a function of the communication training set;
　　input the first communication datum to the first machine-learning model of the communication learner;
　　receive, as an output from the first machine-learning model, a response;
　　identify a second communication datum as a function of the response and the task performance; and
　　update the folder to include the second communication datum.

2. The system of claim 1, wherein the computing device is further configured to:
　examine the folder and identify an outstanding task performance; and
　generate a reminder relating to the outstanding task performance.

3. The system of claim 1, wherein the response further comprises an electronic communication.

4. The system of claim 1, wherein the response further comprises a command.

5. The system of claim 1, wherein the computing device is further configured to:
　generate a reply relating to the second communication datum;
　retrieve a device identifier contained within the folder; and transmit the reply to a user device as a function of the device identifier.

6. The system of claim 5, wherein generating the reply further comprises:
parsing the historical communication data to identify a reply element; and
generating the reply as a function of the reply element.

7. The system of claim 1, wherein updating the folder further comprises:
identifying a subtask relating to the second communication datum; and
storing the second communication datum within the folder as a function of the subtask.

8. The system of claim 1, wherein the computing device is further configured to:
receive a third communication datum;
generate a sorting classifier, wherein the sorting classifier uses a communication datum as an input and outputs a folder label;
output a folder label for the third communication datum as a function of the sorting classifier;
locate a folder as a function of the folder label; and
store the third communication datum within the folder.

9. The system of claim 8, wherein the folder label is generated as a function of a task performance.

10. A method of processing electronic communications into correctly generated folders wherein the correctly generated folders further include responses generated by a communication learner, the method comprising:
receiving by a computing device, a first communication datum from a user device belonging to a user;
generating by the computing device, a folder relating to the first communication datum and a task performance, wherein generating the folder comprises using a language processing module comprising an application programming interface containing communication protocols between the user device, the language processing module, and the communication learner, wherein the language processing module is configured to:
parse at least a request for a task performance and retrieve at least a task performance datum, wherein the task performance datum includes a number of subtasks; and
categorize the at least a request for a task performance to at least a task performance list;
generating by the computing device, the communication learner, wherein generating the communication learner comprises generating a first machine-learning model configured to use historical electronic communication data as an input and output a response related to a task performance of the task performance list, wherein generating the first machine-learning model comprises:
capturing historical electronic communication training data from historical electronic communications between the user and contacts of the user;
creating a communication training set as a function of the historical electronic communication training data, wherein the communication training set contains a plurality of data entries containing the historical electronic communication training data correlated to respective responses; and
training the communication learner as a function of the communication training set;
inputting the first communication datum to the first machine-learning model of the communication learner;
receiving, as an output from the first machine-learning model, a response;
identifying by the computing device a second communication datum as a function of the response and the task performance; and
updating by the computing device, the folder to include the second communication datum.

11. The method of claim 10, wherein locating the folder further comprises:
examining the folder and identify an outstanding task performance; and
generating a reminder relating to the outstanding task performance.

12. The method of claim 10, wherein the response comprises an electronic communication.

13. The method of claim 10, wherein the response comprises a command.

14. The method of claim 10, wherein identifying the second communication datum further comprises:
generating a reply relating to the second communication datum;
retrieving a device identifier contained within the folder; and
transmitting the reply to a user device as a function of the device identifier.

15. The method of claim 14, wherein generating the reply further comprises:
parsing the historical communication data to identify a reply element; and
generating the reply as a function of the reply element.

16. The method of claim 10, wherein updating the folder further comprises:
identifying a subtask relating to the second communication datum; and
storing the second communication datum within the folder as a function of the subtask.

17. The method of claim 10 further comprising:
receiving a third communication datum;
generating a sorting classifier, wherein the sorting classifier uses a communication datum as an input and outputs a folder label;
outputting a folder label for the third communication datum as a function of the sorting classifier;
locating a folder as a function of the folder label; and
storing the third communication datum within the folder.

18. The method of claim 17, wherein outputting the folder label further comprises outputting the folder label as a function of a task performance.

* * * * *